(12) United States Patent
Choi et al.

(10) Patent No.: US 12,482,073 B2
(45) Date of Patent: Nov. 25, 2025

(54) METHOD AND APPARATUS WITH NOISE CONSIDERATION

(71) Applicant: SAMSUNG ELECTRONICS CO., LTD., Suwon-si (KR)

(72) Inventors: Jae Seok Choi, Yongin-si (KR); Kinam Kwon, Yongin-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 873 days.

(21) Appl. No.: 17/700,932

(22) Filed: Mar. 22, 2022

(65) Prior Publication Data
US 2023/0103966 A1   Apr. 6, 2023

(30) Foreign Application Priority Data
Oct. 6, 2021  (KR) .................. 10-2021-0132089

(51) Int. Cl.
G06T 5/70      (2024.01)
G06T 5/50      (2006.01)
G06T 5/60      (2024.01)
G06V 10/40     (2022.01)

(52) U.S. Cl.
CPC ............... *G06T 5/70* (2024.01); *G06T 5/50* (2013.01); *G06V 10/40* (2022.01); *G06T 5/60* (2024.01); *G06T 2207/20081* (2013.01); *G06T 2207/20084* (2013.01); *G06T 2207/20182* (2013.01); *G06T 2207/20224* (2013.01)

(58) Field of Classification Search
CPC ... G06T 5/70; G06T 5/50; G06T 2207/20224; G06T 5/60; G06T 2207/20081; G06T 2207/20084; G06T 5/40; G06T 2207/20182; G06V 10/40
See application file for complete search history.

(56) References Cited

U.S. PATENT DOCUMENTS 9,262,808 B2 *  2/2016  Porikli .................... G06T 5/20
9,749,551 B2    8/2017  Geiss et al.
10,269,095 B2   4/2019  Lim et al.
(Continued)

FOREIGN PATENT DOCUMENTS

JP    2008-252911 A    10/2008
JP    2021-60847 A      4/2021
(Continued)

OTHER PUBLICATIONS

Nair, T. et al., "Adaptive image denoising using a deep neural network with a noise correction map," Applications of Digital Image Processing XLIII, 15, 2020, pp. 1-9. (Year: 2020).*
(Continued)

*Primary Examiner* — Amandeep Saini
*Assistant Examiner* — Daniella M. DiGuglielmo
(74) *Attorney, Agent, or Firm* — NSIP Law

(57) ABSTRACT

A method and apparatus with noise consideration are provided. The method includes generating, using a noise model, a non-normal noise map corresponding to a noise of an input image, and generating an enhanced image of the input image by implementing an image enhancement model based on the input image and the non-normal noise map, where the noise of the input image follows a non-normal distribution.

27 Claims, 17 Drawing Sheets

(56) References Cited

U.S. PATENT DOCUMENTS

| | | | |
|---|---|---|---|
| 2008/0239094 A1* | 10/2008 | Baqai | H04N 23/843 348/207.99 |
| 2014/0218540 A1 | 8/2014 | Geiss et al. | |
| 2020/0219227 A1 | 7/2020 | Giovannelli | |
| 2021/0104021 A1* | 4/2021 | Sohn | G06T 5/70 |
| 2021/0158486 A1 | 5/2021 | Tohme et al. | |

FOREIGN PATENT DOCUMENTS

| | | | |
|---|---|---|---|
| KR | 10-1786161 B1 | 11/2017 | |
| KR | 10-2019-0119548 A | 10/2019 | |
| WO | WO-2020187423 A1 * | 9/2020 | G06T 5/60 |

OTHER PUBLICATIONS

Pythonic Excursions, "Transforming Non-Normal Distribution to Normal Distribution," 2019, pp. 1-11. (Year: 2019).*

Zhang, K. et al., "Beyond a Gaussian Denoiser: Residual Learning of Deep CNN for Image Denoising," IEEE Transactions on Image Processing, 26(2), 2017, pp. 3142-3155. (Year: 2017).*

Korean Office Action issued on Sep. 30, 2024, in counterpart Korean Patent Application No. 10-2021-0132089 (4 pages in English, 7 pages in Korean).

Zhang, Kai, et al. "Beyond a Gaussian Denoiser: Residual Learning of Deep CNN for Image Denoising." IEEE transactions on image processing 26.7 (2017): 3142-3155.

Nair, Tejas, et al. "Adaptive image denoising using a deep neural network with a noise correction map." Applications of Digital Image Processing XLIII. vol. 11510. SPIE, 2020, (9 pages in English).

Extended European search report issued on Feb. 16, 2023, in counterpart European Patent Application No. 22191990.5 (11 pages in English).

* cited by examiner

METHOD AND APPARATUS WITH NOISE CONSIDERATION

CROSS-REFERENCE TO RELATED APPLICATIONS

This application claims the benefit under 35 USC § 119(a) of Korean Patent Application No. 10-2021-0132089 filed on Oct. 6, 2021, in the Korean Intellectual Property Office, the entire disclosures of which are incorporated herein by reference for all purposes.

BACKGROUND

1. Field

The following description relates to method and apparatus with noise consideration.

2. Description of Related Art

Image enhancement is a technology that may include enhancing an image of low or degraded quality. A deep learning-based neural network may be used for performing image enhancement of an image.

After being trained based on deep learning for a special inference purpose, the neural network may perform an inference according to the special purpose, such as by intuitively mapping input data and output data that are in a nonlinear relationship with each other. The trained capability of such a neural network to intuitively generate such mappings may be referred to as a learning or trained capability of the neural network. Further, because of the specialized training, the neural network may thereby perform the image enhancement with a generalization capability to generate a relatively accurate image enhancement of an input pattern or image that the neural network may not have been trained for, for example.

As noted above, a deep learning-based neural network may be used for performing image enhancement of an image, but the training and inference operations may be based on a presumption that noise of the image follows a normal distribution and has a linear characteristic, but real image noise may not follow such a normal distribution. In addition, while theoretically the training of a deep learning-based model with noisy and clean image training pairs should be sufficiently accurate and straight forward, when dealing with real noise of real images it becomes onerous to obtain enough training pairs of captured noisy images and corresponding captured images without noise for training purposes, and there may be pixel position misalignments within training pairs. So, training may be difficult and less accurate for real images with real noise.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a processor-implemented method includes generating, using a noise model, a non-normal noise map corresponding to a noise of an input image, and generating an enhanced image of the input image by implementing an image enhancement model based on the input image and the non-normal noise map, where the noise of the input image follows a non-normal distribution.

The generating of the non-normal noise map may include extracting a first non-normal noise distribution information for a first pixel of the input image from first mapping information of the noise model based a first clean pixel value corresponding to the first pixel, pixel position information of the first clean pixel or of the first pixel, and image capturing parameters regarding a capturing of the input image, determining a first noise value of the first pixel from among plural noise information in the first non-normal noise distribution information for the first pixel, extracting a second non-normal noise distribution information for a second pixel of the input image from second mapping information of the noise model based a second clean pixel value corresponding to the second pixel, pixel position information of the second clean pixel or of the second pixel, and the image capturing parameters regarding the capturing of the input image, determining a second noise value of the second pixel from among plural noise information in the second non-normal noise distribution information for the second pixel, and generating the non-normal noise map based on the first noise value and the second noise value, and the generating of the enhanced image may be dependent at least on the first noise value and the second noise value.

The generating of the non-normal noise map may include, for each pixel of the input image, extracting a non-normal noise distribution information of a pixel of the input image from mapping information of the noise model based on a clean pixel data corresponding to the pixel of the input image, pixel position information of the pixel of the input image or of the clean pixel data corresponding to the pixel of the input image, and image capturing parameters regarding a capturing of the input image, determining a noise value of the pixel of the input image using the non-normal noise distribution information of the pixel, and generating the non-normal noise map based on the noise value of the pixel of the input image.

For each pixel of the input image, the mapping information may include a lookup table (LUT) that maps input data corresponding to the pixel, the pixel position information, and the image capturing parameters, and output data corresponding to the non-normal noise distribution information of the pixel.

The non-normal noise distribution information of the pixel may include first non-normal noise distribution information of the pixel, where the first non-normal noise distribution information may represent a first non-normal distribution for the pixel mapped to a clean pixel value of the pixel, the position information, and the image capturing parameters, and where the noise value of the pixel may be randomly determined from among plural information in the first non-normal distribution.

The non-normal noise distribution information of the pixel may include at least one of first distribution information may represent a distribution of non-normal noise data and second distribution information may represent a distribution of all normal distribution values of the non-normal noise data obtained by projecting the non-normal noise data into a normal distribution space.

The noise value of the pixel may be randomly determined from among the distribution of all normal distribution values.

The non-normal noise distribution information of the pixel may include at least one of first distribution information may represent a distribution of non-normal noise data and second distribution information may represent a distribution of a portion of all normal distribution values of the non-normal noise data obtained by projecting the non-normal noise data into a normal distribution space, and the second distribution information may include a maximum value and a minimum value as the portion of all of the normal distribution values.

The noise value of the pixel may be randomly determined from among a range of values between the maximum value and the minimum value.

The clean pixel data corresponding to the pixel of the input image may be of a clean image obtained through blur filtering performed on the input image.

The image capturing parameters may include at least one of an International Organization for Standardization (ISO) value, an exposure time, and Bayer pattern information.

The generating of the non-normal noise map may include, for each pixel of the input image, generating a normal noise data value corresponding to first partial input data of the pixel of the input image using a normal distribution-based first noise model, generating non-normal noise data value corresponding to second partial input data of the pixel of the input image using a non-normal distribution-based second noise model, and generating the non-normal noise map based on the normal noise data value and the non-normal noise data value.

In one aspect, only the first partial input data may include pixel value information with respect the pixel, and both of the first partial input data and the second partial input data may include some overlapping image capturing parameters regarding a capturing of the first noise modeling image.

The noise of the input image follows the non-normal distribution corresponding to image processing performed on raw image data of the input image.

The image enhancement model may be a machine learning model that may be trained in advance to provide intuitive mapping relationships, for each of a training input data and a training output data of respective plural training input data and plural training output data, between the respective plural training input data and plural training output data, the training input data may include a corresponding training image and a corresponding training non-normal noise map may be generated, using the noise model, corresponding to a noise of the corresponding training image, and the output data may include an enhanced image of the training image.

The image enhancement model may be trained in advance based on training images generated using the noise model.

The method may further include training the noise model based on plural modeling images having respective noises that follow non-normal distributions, including training the noise model based on a noise and pixel position information for each modeling image of the plural modeling images, and training the image enhancement model by, for each training data set of a plurality of training data sets, generating a degraded training image of a clean training image using the noise model, determining a training data set based on the clean training image and the degraded training image, and training the image enhancement model based on the training data set.

The method may further include training the noise model, including, for each of a noise modeling image of a plurality of noise modeling images whose noises each follow non-normal distributions, generating a clean modeling image from the noise modeling image, determining non-normal noise data of the noise modeling image based on a difference between the noise modeling image and the clean modeling image, and determining mapping information of the noise model based on a mapping relationship, for each pixel of the noise modeling image, that is based on distribution information of the non-normal noise data for the pixel, pixel data of the clean modeling image corresponding to the pixel, and pixel position information corresponding to the pixel.

In one general aspect, one or more embodiments include a non-transitory computer-readable storage medium storing instructions that, when executed by a processor, cause the processor to perform any one, any combination, or all operations described herein.

In one aspect, a processor-implemented method includes training a noise model based on plural modeling images having respective noises that follow non-normal distributions, including training the noise model based on a noise and pixel position information for each modeling image of the plural modeling images, and training an image enhancement model by, for each training data set of a plurality of training data sets, generating a degraded training image of a clean training image using the noise model, determining a training data set based on the clean training image and the degraded training image, and training the image enhancement model based on the training data set.

The training of the noise model may include generating a first clean modeling image from a first noise modeling image that follows a non-normal distribution, determining non-normal noise data of the first noise modeling image based on a difference between the first noise modeling image and the first clean modeling image, and determining mapping information of the noise model based on a mapping relationship that may be based on distribution information of the non-normal noise data, pixel data of the first clean modeling image, and the pixel position information.

The distribution information may include at least one of first distribution information may represent a distribution of the non-normal noise data and second distribution information may represent a distribution of at least a portion of all normal distribution values of the non-normal noise data obtained by projecting the non-normal noise data into a normal distribution space.

The second distribution information may represent only the portion of the all normal distribution values, and the second distribution information may include a maximum value and a minimum value as the portion of all of the normal distribution values.

The noise model may include a normal distribution-based first noise model and a non-normal distribution-based second noise model, and the training of the noise model may include determining normal noise data corresponding to first partial input data for a first noise modeling image that follows a non-normal distribution, using the first noise model, determining residual data based on a difference between the normal noise data and non-normal noise data of the first noise modeling image, and determining mapping information of the second noise model based on a mapping relationship that may be based on second partial input data of the first noise modeling image and the residual data.

In one aspect, only the first partial input data may include pixel value information with respect the first noise modeling image, and both of the first partial input data and the second partial data may include some overlapping image capturing parameters regarding a capturing of the first noise modeling image.

The method may further include generating, using the noise model, a non-normal noise pixel information corresponding to a noise of an input image, and generating an enhanced image of the input image by implementing the image enhancement model based on the input image and the non-normal noise pixel information, wherein the noise of the input image follows a non-normal distribution.

In one general aspect, an electronic device includes a processor, and a memory storing instructions, which when executed by the processor configure the processor to generate, using a noise model, a non-normal noise pixel information corresponding to a noise of an input image, and generate an enhanced image of the input image by implementing an image enhancement model based on the input image and the non-normal noise pixel information, where the noise of the input image follows a non-normal distribution.

The device may further include a storage device, where the generated enhanced image may be stored in the storage device or the memory.

The device may further include a camera, and a display, where the input image may be an image captured by the camera, and the instructions further include display instructions, which when executed by the processor, configure the processor to control the display to display the enhanced image.

The instructions, which when executed by the processor, may further configure the processor to extract a first non-normal noise distribution information for a first pixel of the input image from first mapping information of the noise model based a first clean pixel value corresponding to the first pixel, pixel position information of the first clean pixel or of the first pixel, and image capturing parameters regarding a capturing of the input image, determine a first noise value of the first pixel from among plural noise information in the first non-normal noise distribution information for the first pixel, extract a second non-normal noise distribution information for a second pixel of the input image from second mapping information of the noise model based a second clean pixel value corresponding to the second pixel, pixel position information of the second clean pixel or of the second pixel, and the image capturing parameters regarding the capturing of the input image, determine a second noise value of the second pixel from among plural noise information in the second non-normal noise distribution information for the second pixel, and generate the non-normal noise pixel information based on the first noise value and the second noise value, where the generation of the enhanced image may be dependent at least on the first noise value and the second noise value.

Other features and aspects will be apparent from the following detailed description, the drawings, and the claims.

Figure 1:
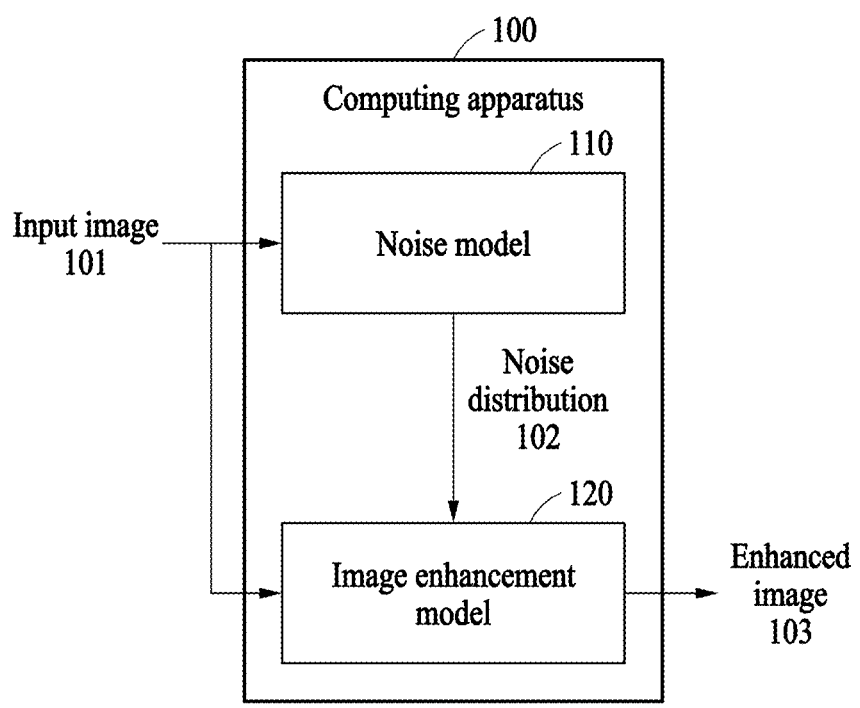
FIG. 1 illustrates an example of image enhancement, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," or "coupled to" another component or element, it may be directly "connected to," or "coupled to" the other component or element, or there may reasonably be one or more other components or elements intervening therebetween. When a component or element is described as being "directly connected to," or "directly coupled to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of image enhancement, according to one or more embodiments. Referring to FIG. 1, a computing apparatus 100 may receive or obtain an input image 101, and generate an enhanced image 103 by enhancing a quality of the input image 101 using a noise model 110 and an image enhancement model 120. The input image 101 may be an image captured or generated, or otherwise obtained, by a camera, an image received or otherwise obtained through a network interface, or an image stored or obtained in advance in a storage device, such as described in more detail further below with respect to the configuration of representative camera(s), network interface(s), and storage device(s) shown in FIG. 19, noting that alternative examples of the obtaining of the input image are further available. The input image 101 may include a degradation characteristic, e.g., a noise, a blur, etc., and the computing apparatus 100 may remove the degradation characteristic by the collective operation of the noise model 110 and the image enhancement model 120.

The computing apparatus 100 may estimate a noise distribution 102 of the input image 101 by implementing the noise model 110 dependent or based on the input image 101, e.g., implementing the noise model 110 provided the input image 101 as an input to the noise model 110. The input image 101 may have a noise that follows a non-normal distribution. For example, the noise of the input image 101 may follow any non-normal distribution, such as noise of the input image 101 having characteristics of real noise, and/or characteristics due to image processing having been performed on raw image data, for example, white balancing, demosaicing, noise reduction, sharpening, color space transform, tone reproduction, and/or compression when the input image 101 is generated from captured raw image information, as non-limiting examples. The noise model 110 may include mapping information, e.g., a lookup table (LUT), between input data corresponding to the input image 101 and output data corresponding to the noise distribution 102. The noise distribution 102 may represent information on a distribution of noise values of a pixel of the input image 101 and/or a distribution of noise values of multiple pixels of the input image 101, e.g., using such a LUT, and/or respective distributions of noise values of multiple pixels of the input image 101, e.g., using multiple LUTs.

The computing apparatus 100 may generate the enhanced image 103 by implementing the image enhancement model 120 based on the input image 101 and the noise distribution 102, e.g., implementing the image enhancement model 120 provided the input image 101 and the noise distribution 102 as respective inputs or as a collective input to the image enhancement model 120. For example, the image enhancement model 120 may be a machine learning model that is trained in advance to provide intuitive mapped relationships between input data corresponding to input images and corresponding noise distributions and output data of corresponding enhanced images, such as between input data corresponding to one or more pixels of the input image 101 and corresponding noise distribution(s) 102 and output data corresponding to the enhanced image 103. The image enhancement model 120 may include, for example, a deep learning network. The image enhancement model 120 may be a deep learning based neural network. The image enhancement model 120 may perform image enhancement by providing such intuitive mappings between such input data and output data that are in a nonlinear relationship. For example, the image enhancement model 120 may be trained to perform image enhancements through deep learning, as a non-limiting example. As an example, the deep learning may include supervised and/or unsupervised learning.

Figure 2:
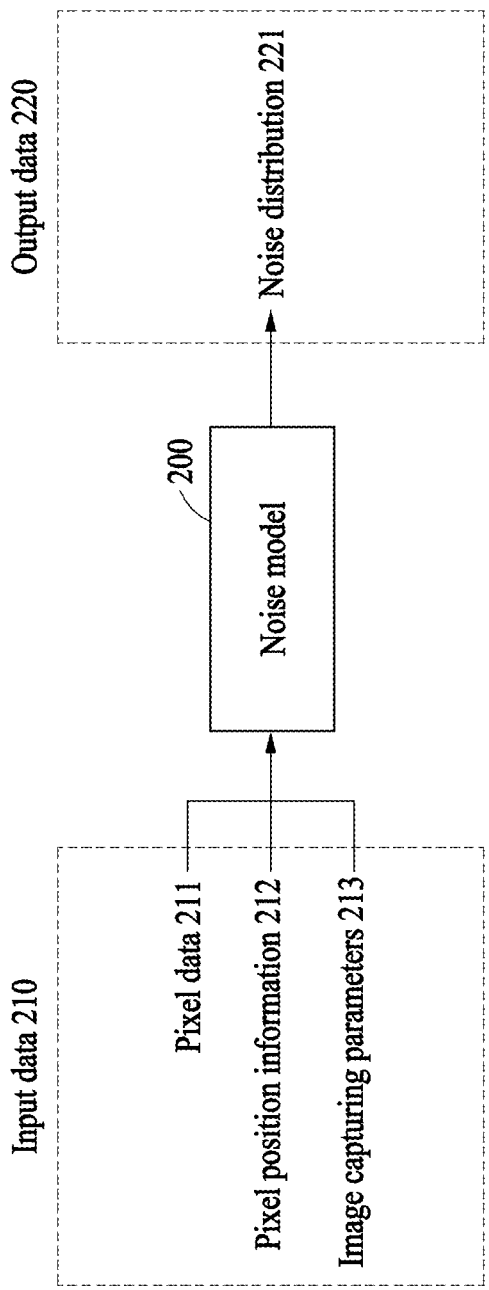
FIG. 2 illustrates an example estimating of noise by a noise model, according to one or more embodiments.

FIG. 2 illustrates an example estimating of a noise by a noise model, according to one or more embodiments. Referring to FIG. 2, a noise model 200 may be trained in advance with mapping relationships between various input data 210 and corresponding output data 220, e.g., using various modeling images. The mapping relationships may be stored in the memory of the corresponding computing apparatus, e.g., in respective LUTs. As a non-limiting example, the estimating of noise by the noise model of FIG. 2 may correspond to the operation of the noise model 110 of FIG. 1. When the input data 210 of an input image is given, the noise model 200 may estimate the output data 220 corresponding to the input data 210. For example, the noise model 200 may determine the output data 220 corresponding to the input data 210 using mapping information, e.g., stored in LUT(s), between the input data 210 and the output data 220. As non-limiting example, FIGS. 6 and 7 each demonstrate such a LUT, where various different types of information of the input data 210, as well as corresponding output noise distribution information. Such various different types of information of the input data 210 may include pixel data 211 of a pixel data type, pixel position information 212 of a pixel position information type, and image capturing parameters 213 of an image capturing parameters type. The output data 220 may include a noise distribution 221, e.g., of a noise distribution type which may include noise distribution information for multiple noise values or select noise values, as non-limiting examples. When the pixel data 211, the pixel position information 212, and the image capturing parameters 213 are given, the noise model 200 may estimate the noise distribution 221 of the input image corresponding to the pixel data 211, the pixel position information 212, and the image capturing parameters 213.

For example, when the input image is given, the noise model 200 may estimate the noise distribution 221 of the input image based on the pixel data 211, the pixel position information 212, and the image capturing parameters 213 of the input image. The pixel data 211 may include pixel values of pixels of the input image, e.g., of a pixel values type, and the pixel position information 212 may include pixel coordinate values and/or distances from a center of the input image as a pixel coordinate information type, as a non-limiting example. In one example, the pixel data 211 of the input image may be data of a clean version of the input image. For example, the clean version of the input image may be a pseudo-clean image generated from the input image, as a non-limiting example. The image capturing parameters 213 may include multiple image capturing information of multiple image capturing information types of the input image, for example, an International Organization for Standardization (ISO) value of an ISO value type, an exposure time of an exposure time type, and Bayer pattern information of a Bayer pattern information type, as non-limiting examples. The exposure time may correspond to a shutter speed. The Bayer pattern information may include information on a filter color, e.g., red, green, blue (RGB), used by a sensor, as only one example, for capturing or otherwise obtaining pixel data, e.g., of the input image. The noise model 200 may estimate the noise distribution 221 that is similar to a noise distribution of real noise by using various sets of information including, for example, the pixel data 211, the pixel position information 212, and the image capturing parameters 213.

Figure 3:
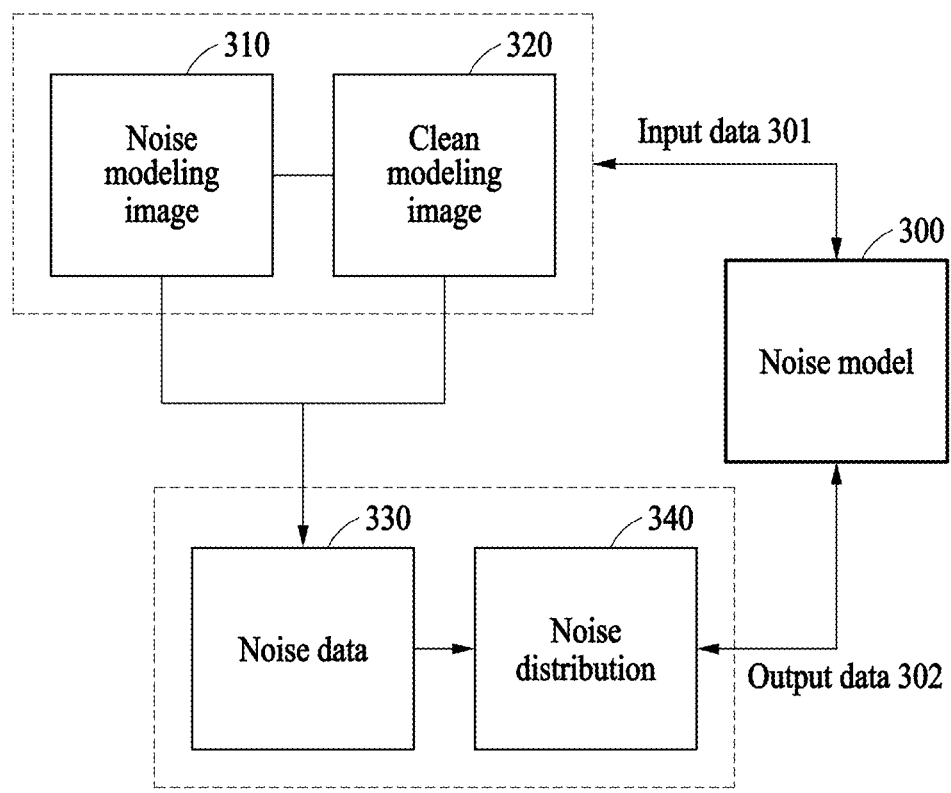
FIG. 3 illustrates an example training of a noise model, according to one or more embodiments.

FIG. 3 illustrates an example training of a noise model, according to one or more embodiments. Referring to FIG. 3, a clean modeling image 320 may be generated based on a noise modeling image 310. For example, the noise modeling image 310 may be obtained by capturing an image of a flat plate of solid color, e.g., gray, and the clean modeling image 320 may be an image resulting from a blur filtering, for example, being performed on the noise modeling image 310. In this example, the resulting image may also be referred to as a pseudo-clean image, as a non-limiting example. The noise modeling image 310 and the clean modeling image 320 may be collectively referred to as modeling images 310 and 320. In an example, the noise modeling image 310 may be a version of the captured image that is obtained by applying some post-processing schemes to raw image data of the captured image. A noise of the noise modeling image 310 may follow a non-normal distribution. Noise data 330 and a noise distribution 340 of the noise modeling image 310 may be determined dependent on a difference between the noise modeling image 310 and the clean modeling image 320. For example, the noise data 330 may include a noise value of each pixel of the noise modeling image 310, while the noise distribution 340 may include distribution information, e.g., respective probability distributions, of plural noise values for each pixel of the noise modeling image 310.

Input data 301 may be configured based on the modeling images 310 and 320, and output data 302 may be configured dependent on noise information of the noise data 330 and the noise distribution 340. For example, the input data 301 may be determined by clean pixel data of the clean modeling image 320, pixel position information of the modeling images 310 and 320, and image capturing parameters of the noise modeling image 310. In addition, the output data 302 may be determined by the noise distribution 340. The clean pixel data may include pixel values of pixels of the clean modeling image 320. The modeling images 310 and 320 may have the same sizes or dimensions, and the pixel position information may include pixel coordinate values and/or distances from the center of the modeling images 310 and 320, e.g., where matching pixels between the modeling images 310 and 320 may be aligned and have the same pixel coordinate values and/or distances from the respective centers because the clean modeling image 320 may be generated from the noise modeling image 310. The image capturing parameters may include an ISO value, an exposure time, and Bayer pattern information that are used when the noise modeling image 310 was captured. References to the image capturing parameters from/of the capturing of the noise modeling image 310 may also be considered to correspond to the image capturing parameters at the time the raw image data of the noise modeling image 310 was captured, e.g., such as when image processing is performed on the raw image data to generate the noise modeling image 310.

Training the noise model 300 may be repeatedly performed using various modeling images. As an example, each of various paired modeling images 310 and 320 may have a different noise modeling image 310 and a clean modeling image 320 corresponding to the different noise modeling image 310, e.g. a pseudo-clean modeling image 320 generated from the different noise modeling image 310. Accordingly, different noise modeling images 310 may be generated by capturing respective images of different objects, e.g., different flat plates with the solid color and/or a flat plate in different solid colors, as well as in various image capturing environments, e.g., various illuminances, etc., under various image capturing conditions, e.g., various ISO values, various exposure times, etc., and corresponding clean modeling images, noise components, and noise distributions may be derived for each different noise modeling image 310. When respective modeling pairs of the input data 301, e.g., input data 210 of FIG. 2, and the output data 302, e.g., noise distribution 221 of FIG. 2, corresponding to each of the different noise modeling images 310 are configured or determined, the noise model 300 may repeatedly learn or be trained with each mapping relationship of the respective modeling pairs.

Figure 4:
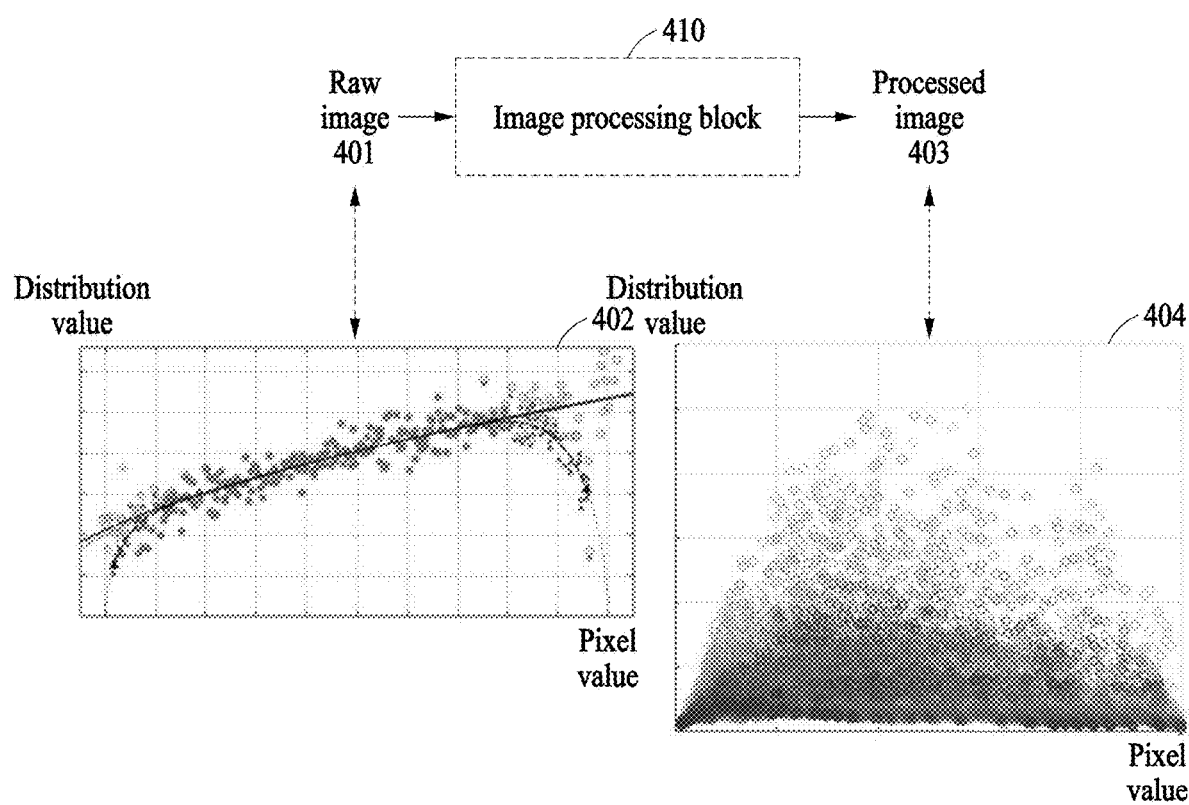
FIG. 4 illustrates an example change in noise distribution of an image due to image processing of the image, according to one or more embodiments.

FIG. 4 illustrates an example change in noise distribution of an image due to image processing of the image, according to one or more embodiments. Referring to FIG. 4, a processed image 403 may correspond to a result of image processing performed on a raw image 401. An image processing block 410 may represent a processor of the corresponding computing apparatus configured to perform such image processing, which includes, for example, white balancing, demosaicing, noise reduction, sharpening, color space transform, tone reproduction, and/or compression, as non-limiting examples. The processed image 403 may be, for example, an RGB image, a YUV image, a JPG image, and a PNG image, as non-limiting examples.

In graphs 402 and 404, the horizontal axes represent respective pixel values, e.g., respectively, a clean pixel value and a processed pixel value, and the vertical axes may represent respective distribution values, e.g., a variance or standard deviation. In each of the graphs 402 and 404, the different shades of points may represent different pixel positions. The shades may be darker as the positions of the pixels are closer to the center of a corresponding image frame. Pixel values and pixel positions of the raw image 401 may be included in input data to a noise model with respect to the raw image 401, and pixel values and pixel positions of the processed image 403 may be included in input data to the noise model with respect to the processed image 403. Likewise, distribution values for the raw image 401 may correspond to the output data of the noise model with respect to the raw image 401, and distribution values for the processed image 403 may correspond to the output data of the noise model with respect to the processed image 403. Each of the respective input data to the noise model for the raw image 401 and the processed image 403 may further include respective image capturing parameters for the raw image 401 and the processed image 403. The respective image capturing parameters are not illustrated in the graphs 402 and 404 for the convenience of description.

The graph 402 may be derived by analyzing noise of the raw image 401, and the graph 404 may be derived by analyzing noise of the processed image 403. For example, in an example case of the noise model corresponding to the noise model 300 of FIG. 3, the raw image 401 may correspond to the noise modeling image 310 and the processes of FIG. 3 may be performed to obtain the noise data 330 with respect to the raw image 401, e.g., the graph 402 may be derived by analyzing clean pixel values of a corresponding clean image of the raw image 401, e.g., a pseudo-clean image of the raw image 401, positions, and a distribution characteristic of noise values of the noise data for the raw image 401. Further, in a similar example case of the noise model corresponding to the noise model 300 of FIG. 3, the processed image 403 may correspond to the noise modeling image 310 and the processes of FIG. 3 may be performed to obtain the noise data 330 with respect to the processed image 403, e.g., the graph 404 may be derived by analyzing clean pixel values of a corresponding clean image of the processed image 403, e.g., a pseudo-clean image of the processed image 403, positions, and a distribution characteristic of noise values of the noise data for the processed image 403.

As illustrated in graph 402, noise of the raw image 401 may follow a normal distribution and have a linear characteristic. Thus, an Nth-order function may be derived through a regression analysis on the noise of the raw image 401. When a pixel value and position of the corresponding pixel of the raw image 401 are specified, one distribution value of the output data can be specified through the Nth-order function.

Rather, graph 404 demonstrates that noise of the processed image 403 may follow a non-normal distribution due to the image processing, and thus, have a nonlinear characteristic. This nonlinear characteristic may be imposed by the image processing block 410 on the raw image 401 when the processed image 403 is generated. In this case of the processed image 403, when the pixel value and corresponding position of the input data are specified, a plurality of distribution values and/or a range of the distribution values may be specified as the output data, compared to the one distribution value that can be specified for the raw image 401 because noise of the raw image 401 follows a normal distribution and has a linear characteristic. For example, a noise model may determine the output data corresponding to the input data of the processed image 403 using one-to-many mapping information, e.g., a LUT, for example, instead of an one-to-one Nth-order function that would be available for determining the output of the raw image 401.

Figure 5:
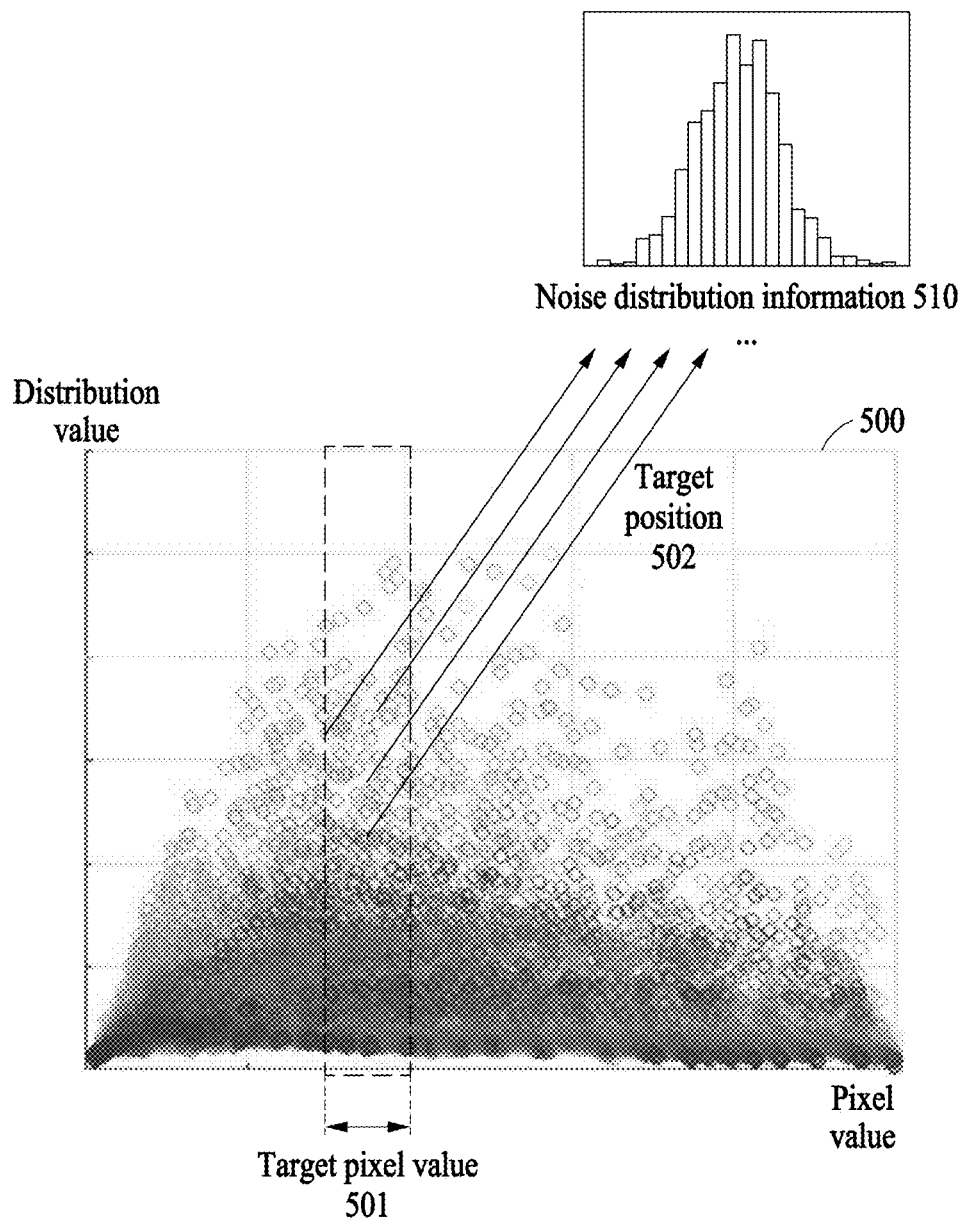
FIG. 5 illustrates an example mapping relationship between a target input and noise distribution information, according to one or more embodiments.

FIG. 5 illustrates an example mapping relationship between a target input and noise distribution information, according to one or more embodiments.

Considering the above example case of the noise model corresponding to the noise model 300 of FIG. 3, and the processed image 403 of FIG. 4 corresponding to the noise modeling image, the processes of FIG. 3 may be performed to obtain the noise data with respect to the processed image 403, as illustrated in graph 500 of FIG. 5. In graph 500, the noise of the processed image does not follow a normal distribution. Regardless, as demonstrated below with respect to graph 520, a noise distribution 510 may still be generated even though the noise of the processing image does not follow a normal distribution.

Noise distribution information may be derived for the processed image by analyzing clean pixel values of a corresponding clean image, e.g., a pseudo-clean image of the processed image, and resulting positions of corresponding noise values of the noise data. For example, the noise values of the noise data, e.g., for each pixel of the processed image, can be classified based on the respective clean pixel values and their respective positions. In this example, first noise distribution information may be determined by first noise values corresponding to a first clean pixel value and a corresponding first position, and second noise distribution information may be determined by second noise values corresponding to the first clean pixel value and a corresponding second position.

Accordingly, as discussed above with respect to FIG. 3, a noise model may be trained with mapping relationships between input data and output data, e.g., input data 301 and output data 302 of FIG. 3, and more particularly, the noise model may be trained with mapping relationships between input data, of a target pixel value 501 and a target position 502, and output data of the noise distribution information. Herein, references to the 'target' pixel value and 'target' position are merely references to input data, e.g., pixel value and position of the clean image version of the processed image, and corresponding output data, in the context of the further below descriptions of the mapping information 610 and 700 of FIGS. 6 and 7, and the available use of such mapping information in the larger context of image enhancement, such as in FIGS. 1, 14, 16-17, and 19, as non-limiting examples.

Accordingly, in this context and as illustrated in graph 500, the noise of the processed image does not follow a normal distribution, and thus the noise distribution information for the processed image may be mapped as the output data to the input data of the target pixel value 501 and the target position 502. However, even though the noise of the processed image does not follow the normal distribution, the noise of the processed image may be represented through normal distribution values by projecting select noise data, e.g., with respect to the input data of the target pixel value 501 and the target position 502, of the processed image in graph 500 into a normal distribution space, resulting in the illustrated noise distribution information 510 in graph 520. The horizontal axis of graph 520 may represent multiple noise values or distribution values with respect to the input data of the target pixel value 501 and the target position 502, while the vertical axis of graph 520 may represent numbers or probabilities. For example, the noise distribution information 510 in graph 520 may represent a probability distribution of multiple noise values or multiple distribution values, and each noise distribution information 510 for each target pixel value/position may similarly be represented by a similar graph 520 also representing a corresponding probability distribution of multiple noise values or multiple distribution values. This is distinguished from the case of a noise of an image following a normal distribution, where a single distribution value can be derived for a particular pixel value/position.

Figure 6:
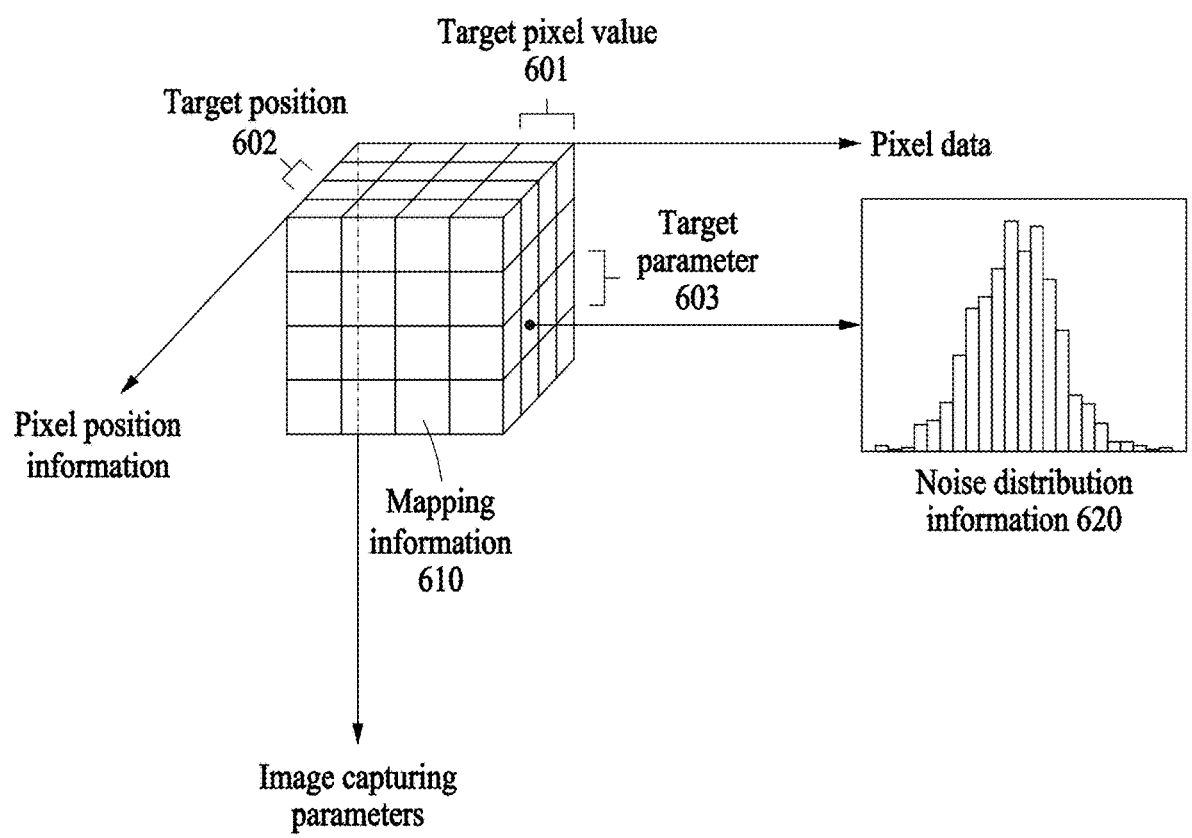
FIG. 6 illustrates an example extracting of noise distribution information from mapping information, according to one or more embodiments.

FIG. 6 illustrates an example extracting of noise distribution information from mapping information, according to one or more embodiments. Referring to FIG. 6, mapping information 610 may store a multidimensional relationship between input data and output data, such as the input data and output data discussed above with respect to FIG. 5. The mapping information 610 may correspond to a LUT. For example, the input data may include pixel data, pixel position information, and image capturing parameters, and the output data may include noise distribution information 620. Although the mapping information 610 is illustrated in FIG. 6 as storing therein a four-dimensional (4D) mapping relationship, the mapping information 610 may store a mapping relationship of less than or greater than four dimensions. For example, when the image capturing parameters include an ISO value, an exposure time, and Bayer pattern information, the mapping information 610 may store a six-dimensional (6D) mapping relationship.

A noise model may be trained with multiple mapping information 610, and may determine the respective output data corresponding to the respective input data using a corresponding mapping information 610. For example, when particular input data of a target pixel value 601, a target position 602, and a target parameter 603 is provided, e.g., corresponding to any one target pixel of an input image, the computing apparatus may extract the noise distribution information 620 corresponding to the input data from the mapping information 610 of the noise model, and determine a noise value of the target pixel using the corresponding noise distribution information 620 for the particular input data. For example, when the noise distribution information 620 represents a probability distribution of multiple noise values for the particular input data, such as in the noise distribution information 510 of FIG. 5, the computing apparatus may randomly select a noise value from among the multiple noise values of the noise distribution information 620. Here, such a random selection of a noise value from among the multiple noise values of the noise distribution information 620 is only an example, and alternate selection or collective consideration approaches of two or more of the multiple noise values may be implemented to derive the select one noise value. Likewise, as only an example, when the noise distribution information 620 represents a probability distribution of multiple distribution values for the particular input data, the computing apparatus may randomly select a distribution value from among the multiple distribution values of the noise distribution information 620, and determine a noise value from the selected distribution value. The computing apparatus may determine respective noise values of each of the other target pixels of the input image using the mapping information 610, and determine a noise image (or a noisy image) corresponding to the input image based on a noise map of the noise values.

Based on a characteristic of the mapping information 610, sets of output data respectively corresponding to sets of input data may be discrete. Thus, an unnatural boundary may be formed in such a noise map. In an example, the computing apparatus may prevent such unnatural boundaries by interpolating the sets of output data. In this example, sets of output data present adjacent to each other may be used for the interpolation, and the interpolation may include averaging. For example, when determining a noise value of input data of the target position 602, the computing apparatus may determine the noise value of the input data of the target position 602 by interpolating the noise distribution information 620 of the input data of the target position 602 and another noise distribution information of input data of at least another target position adjacent to the target position 602. Alternatively, the corresponding selected noise values may also be interpolated. For example, the computing apparatus may determine the noise value of the input data of the target position 602 by interpolating a noise value determined from the noise distribution information 620 and another noise value determined from the other noise distribution information.

Figure 7:
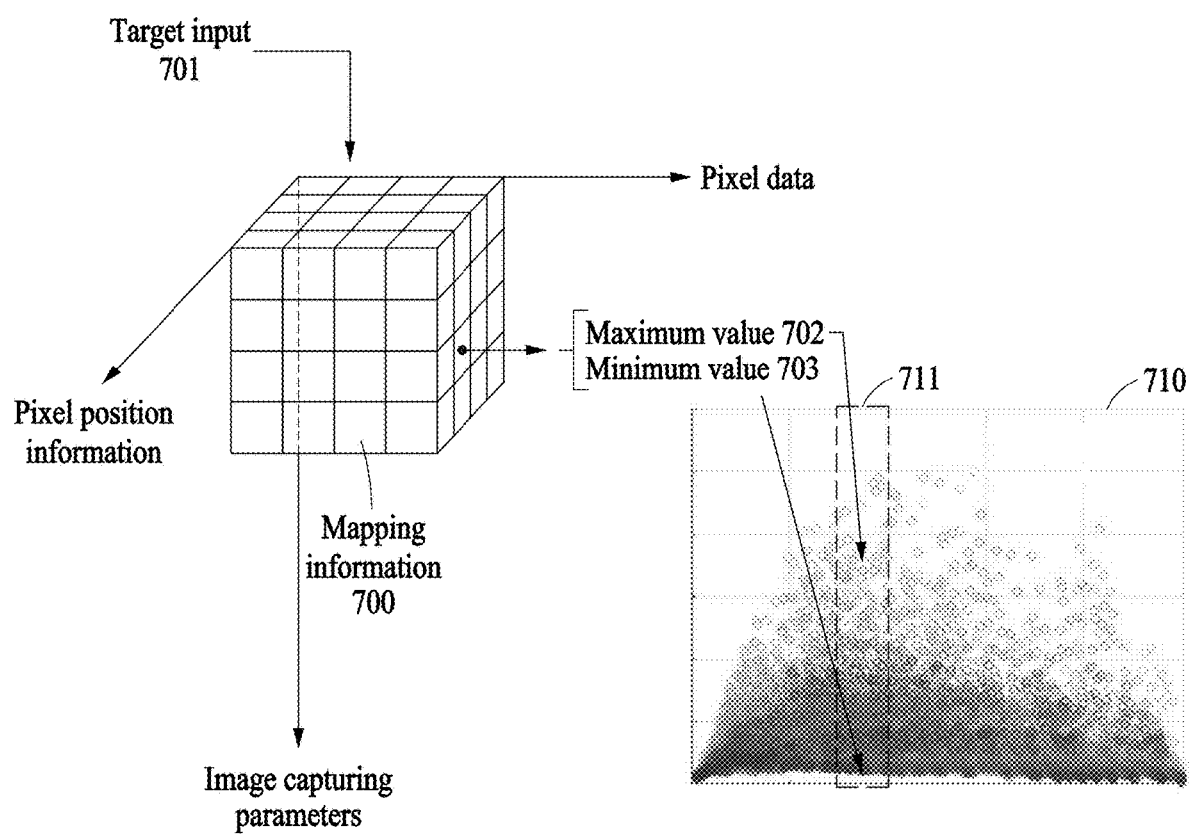
FIG. 7 illustrates an example mapping information including normal distribution values, according to one or more embodiments.

FIG. 7 illustrates an example mapping information including normal distribution values, according to one or more embodiments. Referring to FIG. 7, mapping information 700 may store, as output data, a representative value of the distribution values or noise values, instead of all distribution values or all noise values. As described above, the output data of the mapping information 700 may include noise distribution information, and the noise distribution information may store a probability distribution of multiple noise values or a probability distribution of multiple distribution values for a particular input data. Rather, when the mapping information 700 is generated or stored, among the probability distribution of the multiple noise values or multiple distribution values, only some of this noise distribution information may be saved in the mapping information 700. For example, the saved probability distribution may include only the representative value, e.g., a maximum value 702 and a minimum value 703, of all of the distribution values or all of the noise values. In this case, the probability distribution may not be specified with a highest accuracy, e.g., as the entire probability distribution isn't provided, but a memory space for storing the mapping information 700 may be reduced.

For example, a computing apparatus may extract the maximum value 702 and the minimum value 703 corresponding to a target input 701 from the mapping information 700. The target input 701 may specify a target pixel value, a target position, and a target parameter for a target pixel of an input image. A graph 710 may represent noise data of the input image, and a block 711 may represent the target pixel value. Among distribution values in the block 711, target distribution values corresponding to the target position may be classified, and the representative value, for example, the maximum value 702 and the minimum value 703, may be determined to be the representative values from the target distribution values and saved in the mapping information 700. Upon extracting the maximum value 702 and the minimum value 703, the computing apparatus may randomly select a value from the range of values between the maximum value 702 and the minimum value 703, as a non-limiting example.

Figure 8:
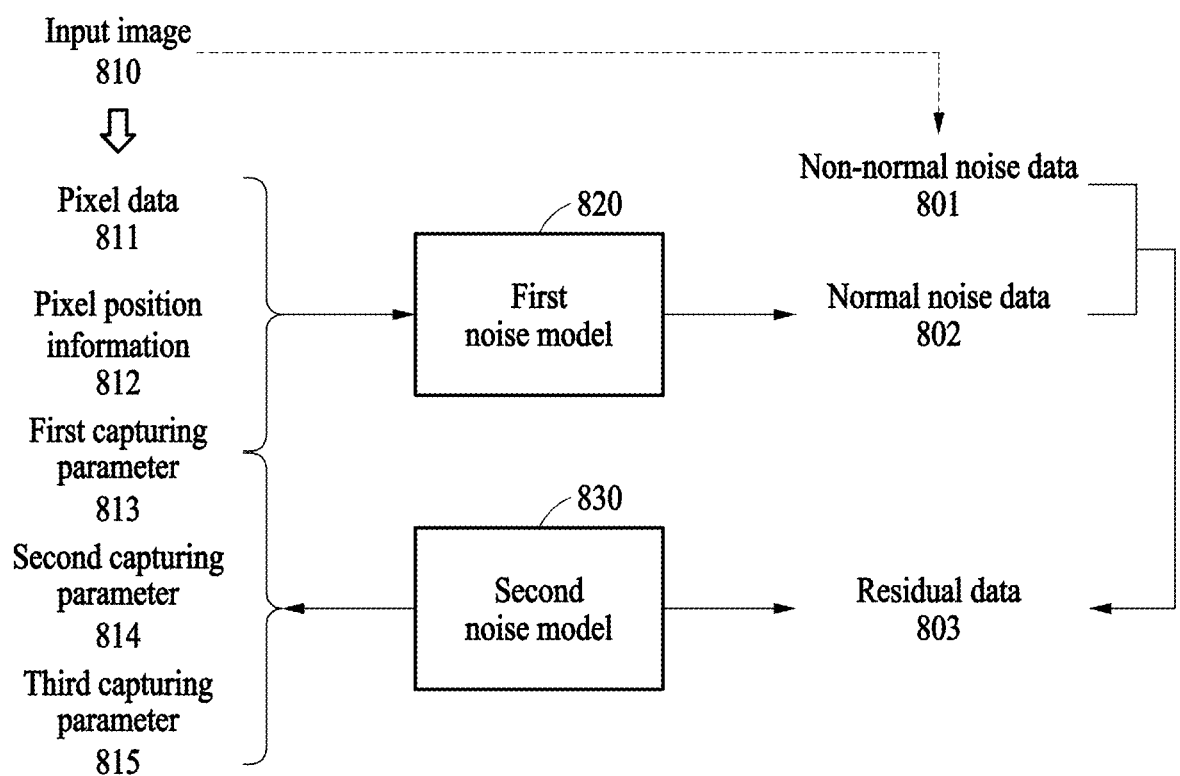
FIGS. 8 and 9 illustrate examples of multi-model training, respectively according to one or more embodiments.
Figure 9:
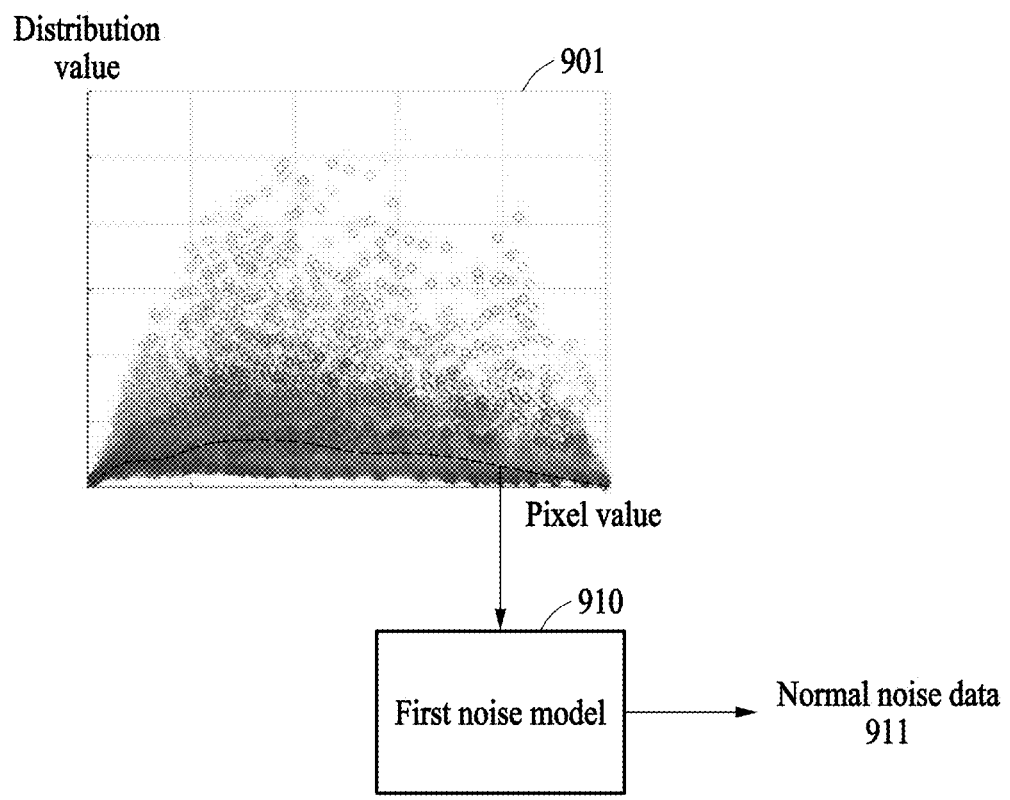

FIGS. 8 and 9 illustrate examples of multi-model training, respectively according to one or more embodiments. Referring to FIG. 8, input data including pixel data 811, pixel position information 812, and image capturing parameters, e.g., a first capturing parameter 813, a second capturing parameter 814, and a third capturing parameter 815, may be obtained from an input image 810. A first noise model 820 may perform noise modeling based on first partial input data corresponding to a portion of the input data, and a second noise model 830 may perform noise modeling based on second partial input data corresponding to at least a remaining portion of the input data. In an example, the first partial input data may include the pixel data 811, the pixel position information 812, and the first capturing parameter 813, and the second partial input data may include the first capturing parameter 813, the second capturing parameter 814, and the third capturing parameter 815. The first partial input data and the second partial input data may share a same portion of the input data, such as the first capturing parameter 813, but may not share any portion of the pixel data 811, for example, e.g., only one of the multiple models may consider the pixel data 811.

Non-normal noise data 801 may be derived from the input image 810. The input image 810 may correspond to a processed image, e.g., the processed image 403 of FIG. 4, and the non-normal noise data 801 may represent a noise of the input image 810 that follows a non-normal distribution. For example, the noise data 801 may include noise values of the input image 810 or distribution values of the noise values.

Because the noise of the input image 810 may have a nonlinear characteristic, it may be difficult to derive a normal distribution-based Nth-order function that can accurately represent this noise with the nonlinear characteristic. Accordingly, the first noise model 820 may model a normal distribution-based noise through an Nth-order function that is specifically derived through rough fitting for noise of a non-normal distribution. Thus, the first noise model 820 may determine normal noise data 802 corresponding to the first partial input data using this specifically derived Nth-order function. Accordingly, the normal noise data 802 may still represent the non-normal noise corresponding to the first partial input data using a normal distribution value, though this value may not be fully accurate due to the rough fitting.

The second noise model 830 may compensate for the error of the derived roughly fitted Nth-order function using mapping information. For example, residual data 803 may be generated correspond to a difference between the non-normal noise data 801 and the normal noise data 802, and the second noise model 830 may be trained with mapping information between the second partial input data and the residual data 803.

After the training of the first noise model 820 and the second noise model 830 has completed, and the trained first noise model 820 and the trained second noise model 830 are implemented to determine a noise value for a corresponding input data, for example, output data of the trained first noise model 820 corresponding to the first partial input data and output data of the trained second noise model 830 corresponding to the second partial input data may be combined, and an estimation of the real noise data of the corresponding input image may be derived therefrom.

Referring to FIGS. 8 and 9, a graph 901 may represent distribution values of the non-normal noise of the input image 810. A first noise model 910 may train an approximately Nth-order function through rough fitting, and generate normal noise data 911 corresponding to first partial input data using the Nth-order function. For example, the first noise model 910 may correspond to the first noise model 820.

In an example, two-dimensional (2D) maps respectively corresponding to pieces of the first partial input data, e.g., the pixel data 811, the pixel position information 812, and the first capturing parameter 813, may be determined, and the maps may be input to the first noise model 910. Each map component of a 2D map corresponding to the pixel data 811 may have a pixel value, e.g., a clean pixel value, corresponding to a pixel position of the pixel data 811. Each component of a 2D map corresponding to the pixel position information 812 may have a distance value from the center of the clean image, for example. In addition, all map components of a 2D map corresponding to the first capturing parameter 813 may have the same parameter value. For example, all map components of a 2D map based on an ISO parameter may have the same value based on ISO settings. The 2D maps may be the same size as the input image 810.

The normal noise data 911 may represent a noise value of each pixel of the input image 810 or a distribution value of the noise value as a 2D map according to a pixel position of the input image 810. For example, the first noise model 820 may learn or be trained with a mapping relationship between the 2D maps respectively corresponding to the pixel data 811, the pixel position information 812, and the first capturing parameter 813, and a 2D map corresponding to the normal noise data 802 to derive a specific Nth-order function, e.g., alike the specifically derived Nth-order function of the first noise model 820. In this example, rather than directly mapping values of map components of each 2D map, the first noise model 820 may map square values of the values of the map components.

A non-normal distribution-based noise model, e.g. the second noise model 830, may require more resources than a normal distribution-based noise model, e.g., the first noise model 820, for storing and processing mapping information. As the dimensions of the mapping information increases, greater memory space may be occupied. In addition, the computation amount used to calculate the noise using the mapping information may increase significantly with increases in the dimensions of the mapping information. Specifically, a computation amount used for performing interpolation may increase more significantly with increases in the dimensions of the mapping information. However, by using a multi-model, e.g., the first noise model 820 and the second noise model 830, where each of the models only consider respective portions of the input data regarding the input image, e.g., the aforementioned first and second partial input data, the dimensions of the mapping information provided to each model may be reduced since less than all dimensions corresponding to all input data can be provided to each model, which may reduce the use of the resources for the non-normal distribution-based noise model.

Figure 10:
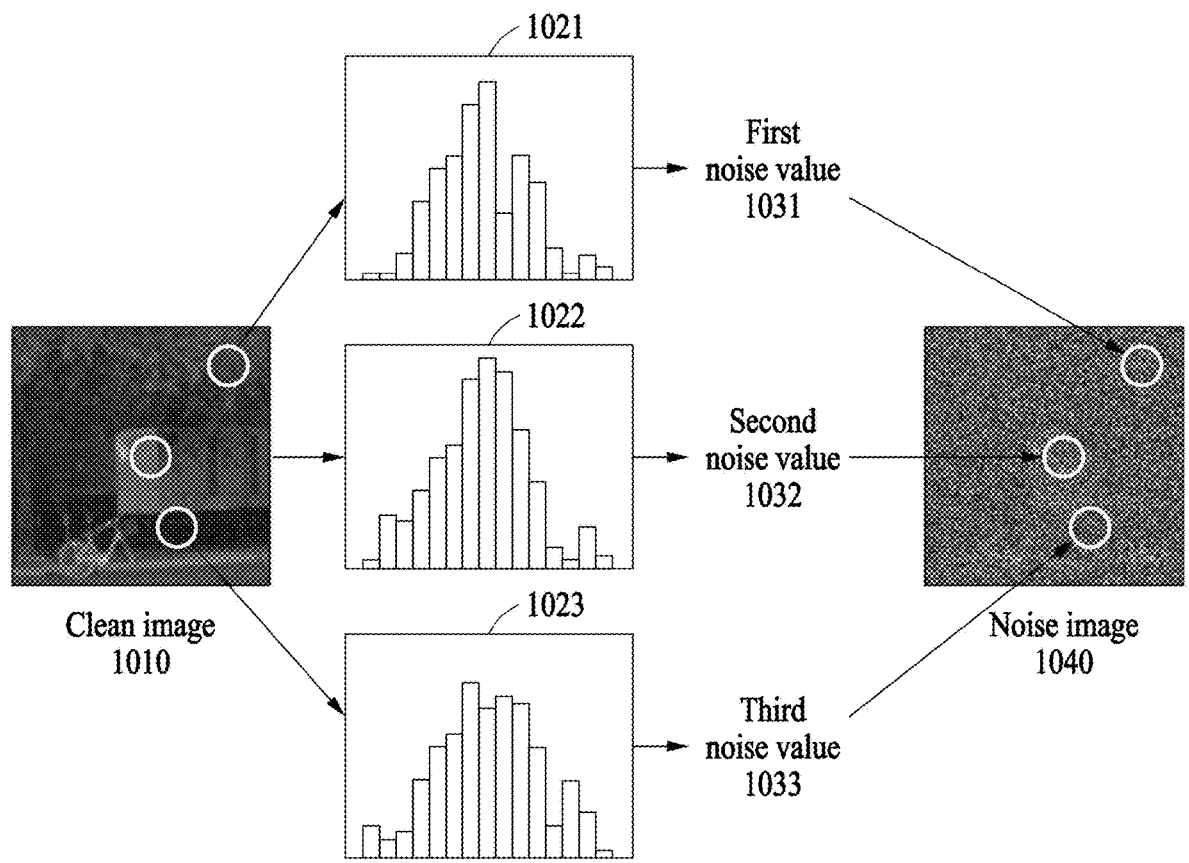
FIG. 10 illustrates an example generating of a noise image using noise distribution information, according to one or more embodiments.

FIG. 10 illustrates an example generating of a noise image using noise distribution information, according to one or more embodiments.

Referring to FIG. 10, noise distribution information, e.g., first noise distribution information 1021, second noise distribution information 1022, and third noise distribution information 1023, corresponding to a pixel of a clean image 1010 may be determined based on mapping information of a non-normal distribution-based noise model. For example, the first noise distribution information 1021 may be determined based on pixel data, position information, and image capturing parameters of a first pixel of the clean image 1010, the second noise distribution information 1022 may be determined based on pixel data, position information, and image capturing parameters of a second pixel of the clean image 1010, and the third noise distribution information 1023 may be determined based on pixel data, position information, and image capturing parameters of a third pixel of the clean image 1010. The noise distribution information, e.g., each of noise distribution information 1021, 1022, and 1023, as well as the remaining noise distribution information with respect to each remaining pixel of the clean image 1010, may represent respective probability distributions of noise values corresponding to multiple or all pixels of the clean image 1010 or respective probability distributions of distribution values corresponding to multiple or all pixels of the clean image 1010.

From the noise distribution information, e.g., each of the noise distribution information 1021, 1022, and 1023, as well as the remaining noise distribution information with respect to each remaining pixel of the clean image 1010, respective noise values for each pixel of the clean image 1010 may be determined. When the noise distribution information, e.g., each of the noise distribution information 1021, 1022, and 1023, each represent the probability distribution of noise values, respective noise values may be randomly selected from each of the noise distribution information, e.g., each of the noise distribution information 1021, 1022, and 1023. For example, a first noise value 1031 for the first pixel may be randomly selected from the first noise distribution information 1021, a second noise value 1032 for the second pixel may be randomly selected from the second noise distribution information 1022, and a third noise value 1033 for the third pixel may be randomly selected from the third noise distribution information 1023. When the noise distribution information, e.g., each of the noise distribution information 1021, 1022, and 1023, each represent the probability distribution of distribution values, a distribution value may be randomly selected from each of the noise distribution information, e.g., each of the noise distribution information 1021, 1022, and 1023. For example, a first distribution value for the first pixel may be randomly selected from the first noise distribution information 1021, a second distribution value for the second pixel may be randomly selected from the second noise distribution information 1022, and a third distribution value for the third pixel may be randomly selected from the third noise distribution information 1023. In addition, when the noise distribution information, e.g., each of the noise distribution information 1021, 1022, and 1023, each include only representative values, e.g., a minimum and maximum noise or distribution values, a noise or distribution value may be randomly selected from among the respective ranges between each minimum and maximum value, to select the respective noise or distribution values.

When the noise values 1031, 1032, and 1033 are determined or generated, a noise image 1040 may be generated by combining or adding the noise values 1031, 1032, and 1033 with the corresponding pixels of the clean image 1010. In an example, a noise map may be determined based on the noise values 1031, 1032, and 1033, and the noise image 1040 may be determined by combining or concatenating the clean image 1010 and the noise map.

Figure 11:
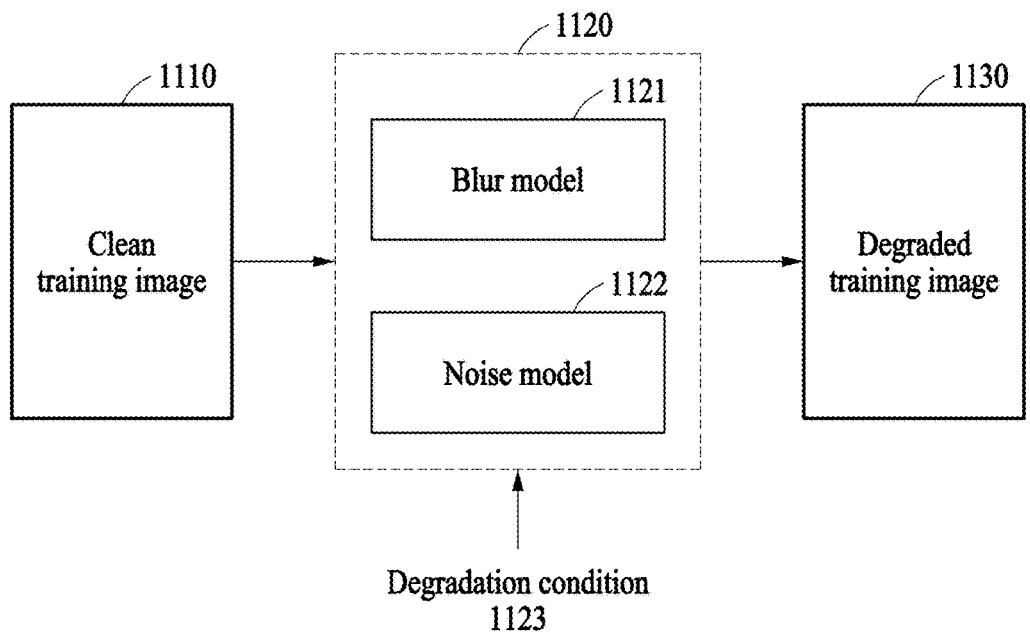
FIG. 11 illustrates an example generating of a training image, according to one or more embodiments.

FIG. 11 illustrates an example generating of a training image, according to one or more embodiments. Referring to FIG. 11, a degradation model 1120 may include a blur model 1121 and a noise model 1122. The blur model 1121 may add a blur effect to a clean training image 1110, and the noise model 1122 may add a noise effect to the clean training image 1110. A degraded training image 1130 may be generated based on the applications of the blur effect and the noise effect to the clean training image 1110. For example, the blur model 1121 may generate a blurred image by adding the blur effect to the clean training image 1110, the noise model 1122 may generate the degraded training image 1130 by adding the noise effect to the blurred image. However, the order in which the blur effect and the noise effect are added is not limited to the foregoing example.

The degradation model 1120 may generate the degraded training image 1130 based on a degradation condition 1123. Each of one or more degradation elements may be set based on the degradation condition 1123. For example, the degradation condition 1123 may include a blur condition controlling or setting a blur effect to be applied by the blur model 1121, and a noise condition associated controlling or setting a noise effect to be applied by the noise model 1122. For example, the blur condition may include motion information, and the blur model 1121 may generate the blurred image based on the clean training image 1110 and the motion information. The noise condition may include pixel position information and image capturing parameters, and the noise model 1122 may generate the degraded training image 1130 based on pixel data of the blurred image, pixel position information, and image capturing parameters of the blurred clean training image, such as in the non-limiting example where the blur mode 1121 first generates the blurred image, and the noise model 1122 generates the degraded training image 1130 from the blurred image.

A training data set may be determined based on the clean training image 1110 and the degraded training image 1130, and an image enhancement model may be trained based on the training data set. For the training of the image enhancement model, various training data sets may be needed. Accordingly, the degradation model 1120 may generate many different versions of the degraded training images 1130 from the same clean training image 1110 by changing the degradation condition 1123. Further, by using a different clean training image 1110, with such varied degradation conditions 1123, diverse versions of additional degraded training images 1130 may be generated with respect to the different clean training image 1110 . . . 1110. Additionally, for example, by adjusting an exposure time to be a long exposure time a long-exposure degraded training image 1130 may be generated, and by adjusting the exposure time to be a short exposure time a short-exposure degraded training image 1130 may be generated. In an example, a degraded training image 1130 may be generated with enhanced noise realism, e.g., with noise characteristics that mimic real noise very well, by implementing the blur model 1121, and by implementing the noise model 1122 according to a long-exposure or short-exposure characteristic noise condition of the degradation condition 1123. For example, a long or short exposure degraded training image 1130 may be generated with enhanced realism by implementing the blur model 1121 with respect to the clean training image 1110, and then implementing the noise model 1122 according to the long-exposure or short-exposure characteristic noise condition of the degradation condition 1123, or by implementing the noise model 1122 with respect to the clean training image 1110 according to the long-exposure or short-exposure characteristic noise condition of the degradation condition 1123, and then implementing the blur model 1121 with respect to the result of the noise model 1122.

Figure 12:
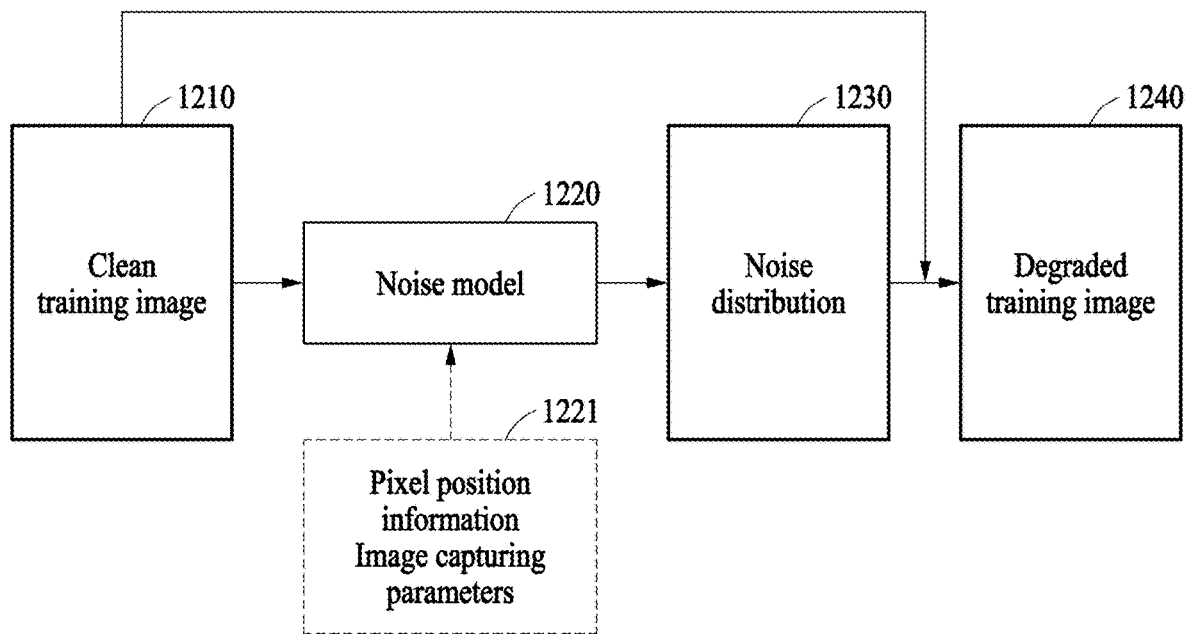
FIG. 12 illustrates an example generating of a degraded training image by estimating a noise distribution by a noise model, according to one or more embodiments.

FIG. 12 illustrates an example generating of a degraded training image by estimating a noise distribution by a noise model, according to one or more embodiments. Referring to FIG. 12, a noise model 1220 may estimate a noise distribution 1230 based on a clean training image 1210 and a degradation condition 1221. For example, the degradation condition 1211 may include pixel position information and image capturing parameters. Accordingly, in an example, the noise model 1220 may estimate the noise distribution 1230 based on pixel data, pixel position information, and image capturing parameters of the clean training image 1210. In an example, a blur effect may be applied to the clean training image 1210, and pixel data of the blurred image may be used instead of the pixel data of the clean training image 1210. A degraded training image 1240 may be obtained based on the clean training image 1210 and the noise distribution 1230. For example, a noise map may be generated from the noise distribution 1230 through random selection, and the degraded training image 1240 may be generated by applying, e.g., adding, the noise map to the clean training image 1210. The clean training image 1210, the noise distribution 1230, and the degraded training image 1240 may be considered a training data set.

Figure 13:
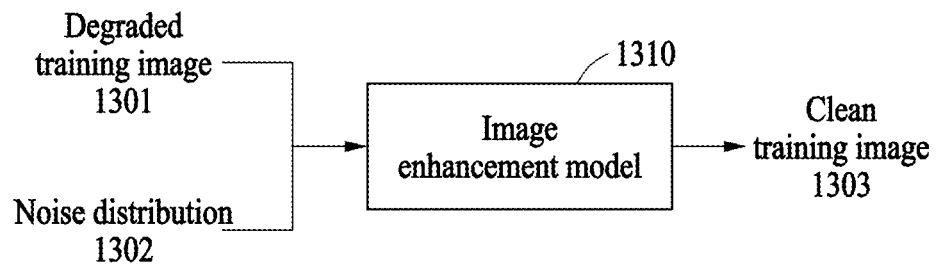
FIG. 13 illustrates an example training of an image enhancement model, according to one or more embodiments.

FIG. 13 illustrates an example training of an image enhancement model, according to one or more embodiments. Referring to FIG. 13, an image enhancement model 1310 may be trained based on a degraded training image 1301, a noise distribution 1302, and a clean training image 1303. The degraded training image 1301, the noise distribution 1302, and the clean training image 1303 may correspond to a training data set, such as discussed above with respect to FIG. 12. As described above, a degradation model may generate the degraded training image 1301 and the noise distribution 1302 based on the clean training image 1303. The image enhancement model 1310 may learn or be trained to intuitively map relationships between input data corresponding to the degraded training image 1301 and the noise distribution 1302 and output data corresponding to the clean training image 1303. For example, the image enhancement model 1310 may learn or be trained to intuitively map such relationships using many respective data training sets of diverse degraded training images 1301 and corresponding noise distributions 1302 and clean training images 1303. Thus, when an input image and a noise distribution of the input image are given, the trained image enhancement model 1310 may have an ability to infer or intuit an enhanced image of the input image.

The image enhancement model 1310 may be a machine learning model. The image enhancement model 1310 may include, as only an example, a deep learning network, such that the image enhancement model 1310 may perform image enhancement by intuitive mappings, e.g., by supervised and/or unsupervised learning in advance, of input data and output data that may be in nonlinear relationships with each other. Based on the degraded training image 1301 and the noise distribution 1302, training input data may be determined. For example, the degraded training image 1301 and the noise distribution 1302 may be concatenated, and the training input data to the image enhancement model 1310 may thereby be determined. For example, when the image enhancement model 1310 is the machine learning model, a collective input to the machine learning model may be the concatenated degraded training image 1301 and noise distribution 1302. The clean training image 1303 may be determined to be training output data. The image enhancement model 1310 may be repeatedly trained to generate the training output data based on the training input data. The image enhancement model 1310 may be repeatedly trained so as to generate each of many different training output, respectively based on corresponding training input data, e.g., until implementation of the resulting in-training image enhancement model has met a predetermined high accuracy threshold and/or meets a predetermined low inaccuracy threshold, for example.

Figure 14:
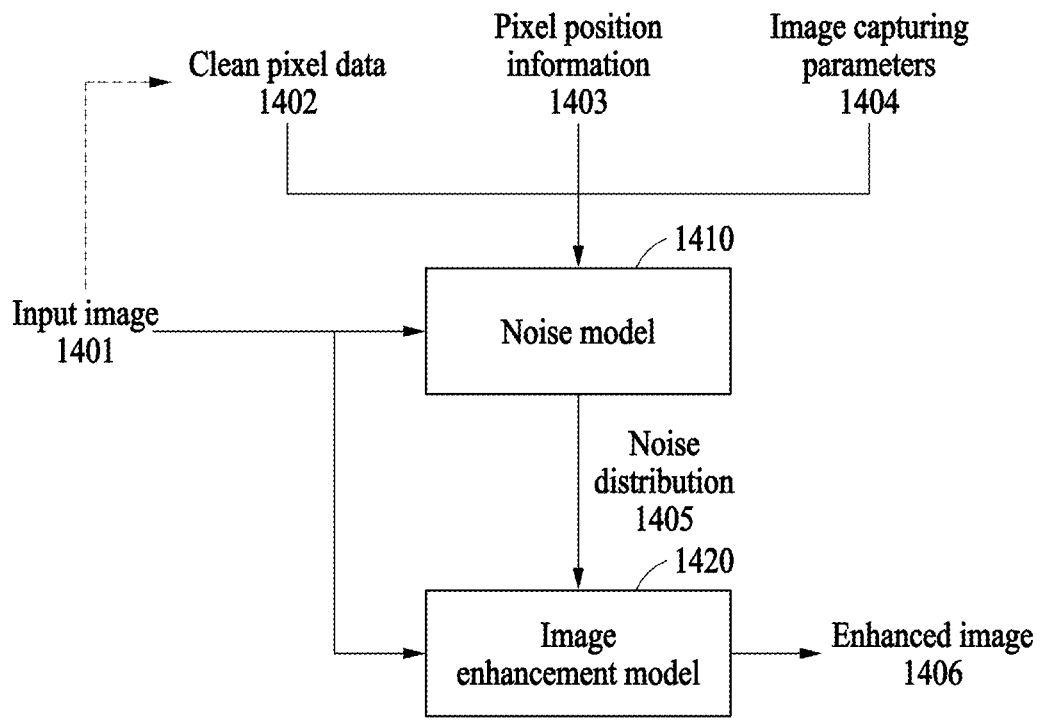
FIG. 14 illustrates an example enhancing of an image using a noise model and an image enhancement model, according to one or more embodiments.

FIG. 14 illustrates an example enhancing of an image using a noise model and an image enhancement model. Referring to FIG. 14, a noise model 1410 may estimate a noise distribution 1405 of an input image 1401 based on the input image 1401. For example, the noise model 1410 may estimate the noise distribution 1405 based on pixel data 1402, pixel position information 1403, and image capturing parameters 1404 of the input image 1401.

The pixel data 1402 may include pixel values that are based on pixel values of the input image 1401, and the pixel position information 1403 may include respective pixel coordinate values and/or distances from a center, e.g., corresponding to a center of an image including the pixel value included in the pixel data 1402. The center may be a predetermined center dependent on the size or dimensions of an image, for example. A pseudo-clean image may be generated by applying blur filtering to the input image 1401, and the pixel data 1402 may be clean pixel data 1402 determined from pixel values of the pseudo-clean image. The image capturing parameters 1404 may include image capturing information of the input image 1401, e.g., sensor information or other information related to the capturing of the input image 1401. The noise model 1410 may estimate the noise distribution 1405 based on a distance from the center of the input image 1401 to each pixel of the input image 1401.

An image enhancement model 1420 may generate an enhanced image 1406 based on the input image 1401 and the noise distribution 1405. For example, input data may be generated by combining or concatenating the input image 1401 and the noise distribution 1405, and by implementation of the image enhancement model 1420 provided the generated input data, the image enhancement model 1420 may generate or output the enhanced image 1406. The image enhancement model 1420 may be a machine learning model that learns or is trained in advance to intuitively map relationships between input data corresponding to the input image 1401 and the noise distribution 1405 and output data corresponding to the enhanced image 1406, as well as to intuitively map respective relationships between many different input data corresponding to different input images and corresponding noise distributions and output enhanced images. In addition, the image enhancement model 1420 may be trained in advance based on training images generated through the noise model 1410. Still further, because of this training of the image enhancement model 1420, the image enhancement model 1420 may generate an enhanced image 1406 for an input image 1401 that the image enhancement model 1420 was not trained for.

Figure 15:
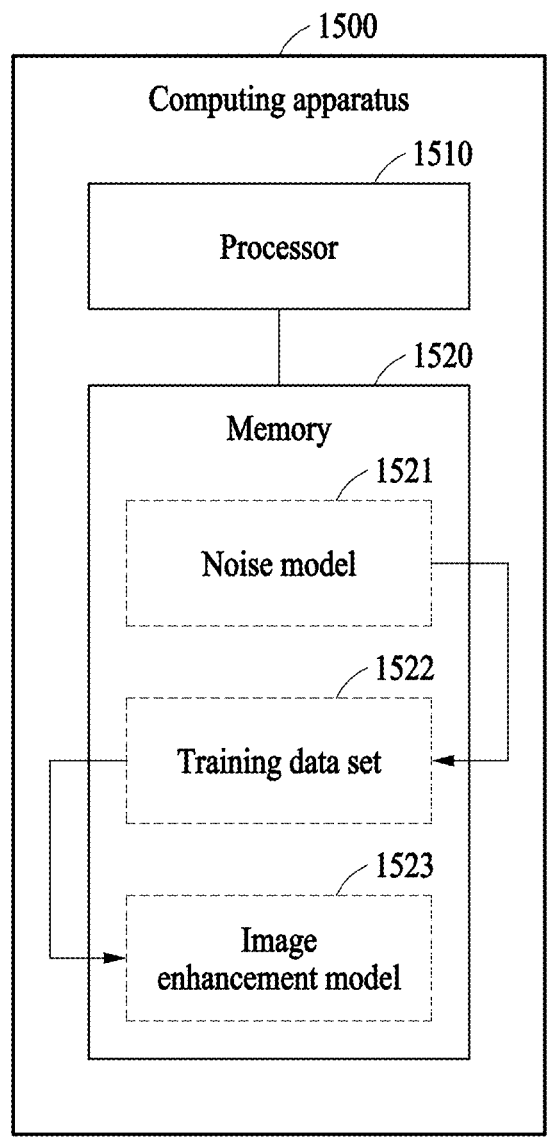
FIG. 15 illustrates an example computing apparatus, according to one or more embodiments.

FIG. 15 illustrates an example computing apparatus, according to one or more embodiments. Referring to FIG. 15, a computing apparatus 1500 may include a processor 1510 and a memory 1520. The memory 1520 may be connected to the processor 1510, and store therein instructions executable by the processor 1510, data to be processed by the processor 1510, and/or data processed by the processor 1510. For example, the memory 1520 may store a noise model 1521, a training data set 1522, and an image enhancement model 1523. The memory 1520 may include a non-transitory computer-readable medium, for example, a high-speed random-access memory (RAM) and/or a nonvolatile computer-readable medium, e.g., one or more disk storage devices, flash memory devices, or other nonvolatile solid-state memory devices.

The processor 1510 may execute instructions to perform any one, any combination, or all operations described herein with respect to FIGS. 1 through 14 and 16 through 19, e.g., where execution of the instructions by the processor 1510 configures the processor 1510 to perform any one, any combination, or all operations described herein with respect to FIGS. 1 through 14 and 16 through 19. For example, the processor 1510 may train the noise model 1521 based on respective modeling images having noises that follows non-normal distributions and corresponding pixel position information, respectively generate different degraded training images of corresponding clean training images using the noise model 1521, determine multiple training data sets 1522 based on the respectively generated different degraded training images and the corresponding clean training images, and train the image enhancement model 1523 based on the multiple training data sets 1522. In addition, the computing apparatus 1500 may be configured to perform one or more or all operations described herein with respect to FIGS. 1 through 14 and FIGS. 16 through 19. For example, in addition to training, the computing apparatus 1500 may further use the trained noise model and trained image enhancement model, to perform image enhancement of an input image, as described in any one, any combination, or all embodiments herein.

Figure 16:
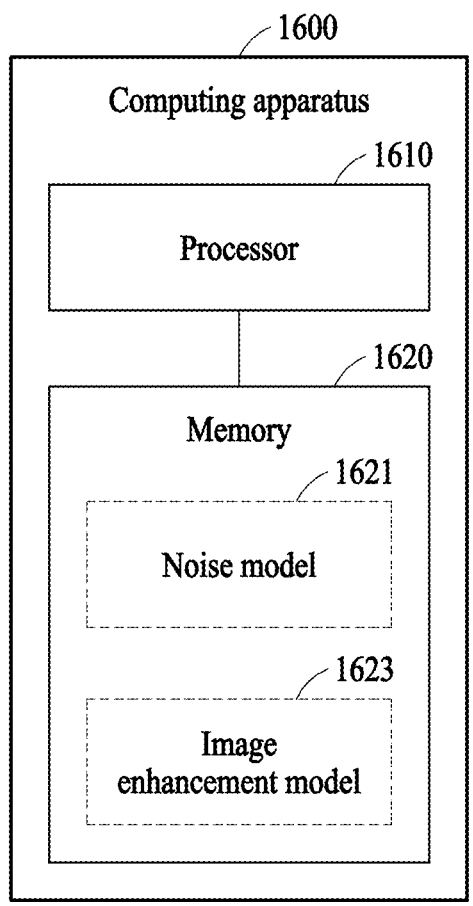
FIG. 16 illustrates an example computing apparatus, according to one or more embodiments.

FIG. 16 illustrates an example computing apparatus, according to one or more embodiments. Referring to FIG. 16, a computing apparatus 1600 may include a processor 1610 and a memory 1620. The memory 1620 may be connected to the processor 1610, and may store therein instructions executable by the processor 1610, data to be processed by the processor 1610, and/or data processed by the processor 1610. For example, the memory 1620 may store a noise model 1621 and an image enhancement model 1623. The processor 1610 may execute instructions to perform any one, any combination, or all operations described herein with respect to FIGS. 1 through 15 and 17 through 19, e.g., where execution of the instructions by the processor 1610 configures the processor 1610 to perform any one, any combination, or all operations described herein with respect to FIGS. 1 through 15 and 17 through 19. For example, the processor 1610 may receive or obtain an input image. For the input image that has a noise that follows a non-normal distribution, the processor may determine a non-normal noise map corresponding to the noise of the input image using the noise model 1621, and generate an enhanced image by implementing the image enhancement model 1623 based or dependent on the input image and the non-normal noise map. In addition, the computing apparatus 1600 may be configured to perform one or more or all operations described herein with respect to FIGS. 1 through 15 and 17 through 19. For example, in addition to performing image enhancement of an input image, the computing apparatus 1600 may further perform training to generate the noise model and/or training to generate the image enhancement model, as described in any one, any combination, or all embodiments herein.

Figure 17:
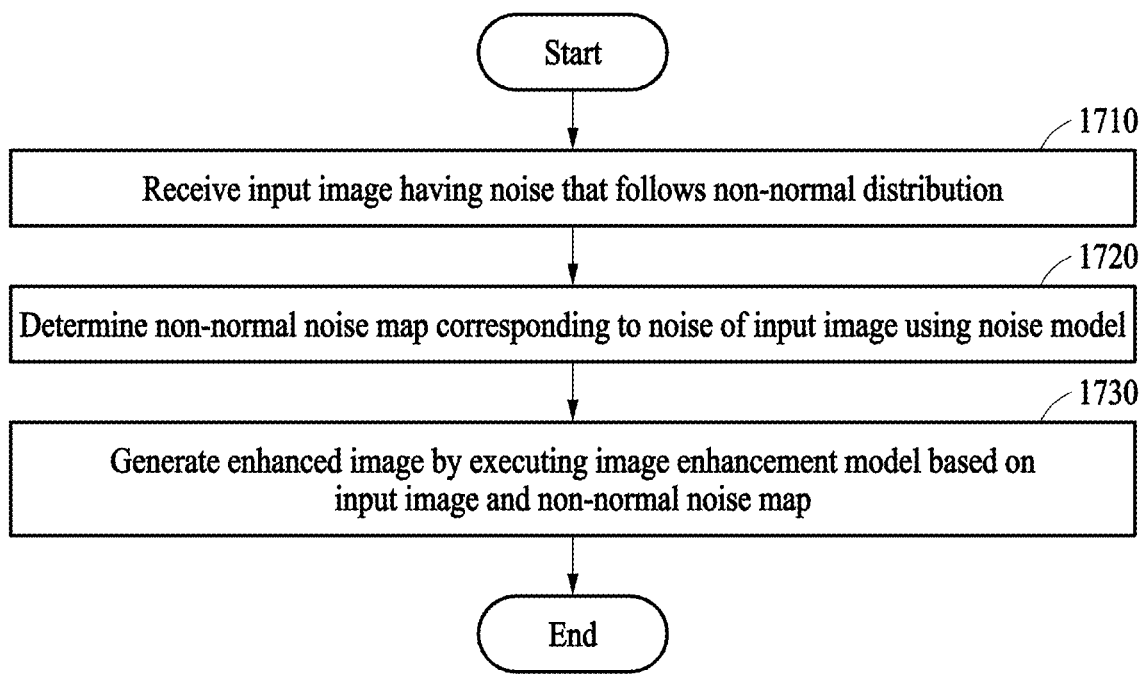
FIG. 17 illustrates an example image enhancement method, according to one or more embodiments.

FIG. 17 illustrates an example image enhancement method, according to one or more embodiments. Referring to FIG. 17, a computing apparatus may receive or obtain an input image having a noise that follows a non-normal distribution in operation 1710, determine a non-normal noise map corresponding to the noise of the input image using a noise model in operation 1720, and generate an enhanced image by implementing an image enhancement model based or dependent on the input image and the non-normal noise map in operation 1730.

Operation 1720 may include extracting non-normal noise distribution information of each pixel of the input image from mapping information of the noise model based on clean pixel data, pixel position information, and image capturing parameters of the input image, determining a noise value of each pixel of the input image using the non-normal noise distribution information, and determining the non-normal noise map based on the noise value of each pixel of the input image.

The mapping information may be a LUT that maps input data corresponding to the pixel data, the pixel position information, and the image capturing parameters, and output data corresponding to the non-normal noise distribution information. The non-normal noise distribution information may include first non-normal noise distribution information of a first pixel of the input image, and the first non-normal noise distribution information may represent a first non-normal distribution mapped to a clean pixel value of the first pixel, position information of the first pixel, and the image capturing parameters. A first noise value of the first pixel may be randomly determined based on the first non-normal distribution.

The non-normal noise distribution information may include at least one of first distribution information representing a distribution of non-normal noise data and second distribution information representing a distribution of normal distribution values of the non-normal noise data obtained by projecting the non-normal noise data into a normal distribution space. The second distribution information may include entire data of the normal distribution values. Alternatively, as a non-limiting example, the second distribution information may include a maximum value and a minimum value of the normal distribution values, instead of the entire data of the normal distribution values.

Operation 1720 may include determining normal noise data corresponding to first partial input data of the input image using a normal distribution-based first noise model, determining non-normal noise data corresponding to second partial input data of the input image using a non-normal distribution-based second noise model, and determining the non-normal noise map based on the normal noise data and the non-normal noise data.

The clean pixel data of the input image may be obtained through blur filtering performed on the input image. The image capturing parameters may include at least one of an ISO value, an exposure time, and Bayer pattern information. The noise of the input image may follow the non-normal distribution, e.g., due to image processing having been performed on raw image data to generate the input image. The image enhancement model may be a machine learning model that is trained in advance to intuitively map relationships between input data corresponding to the input image and the non-normal noise map and output data corresponding to the enhanced image. The image enhancement model may be trained in advance based on many training images generated using the noise model.

In addition, the image enhancement method of FIG. 17 may further include operations described above with respect to FIGS. 1 through 16 and operations described hereinafter with respect to FIGS. 18 and 19.

Figure 18:
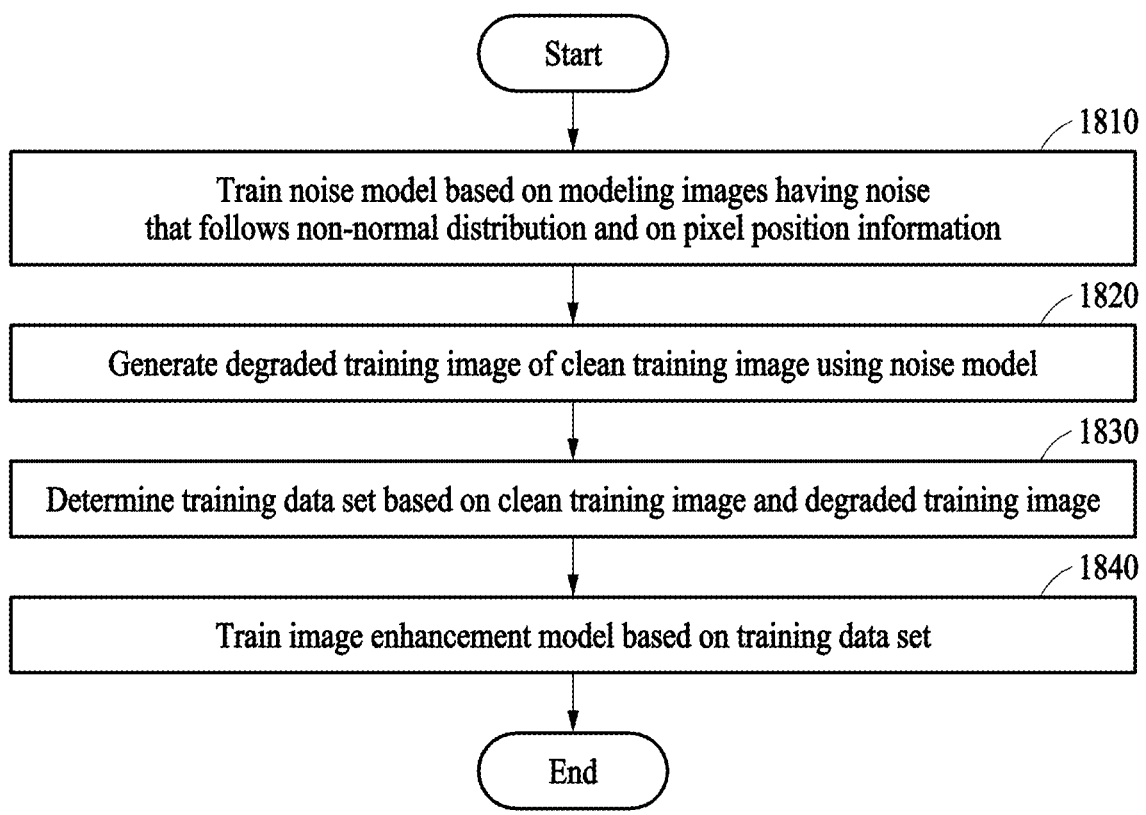
FIG. 18 illustrates an example training method, according to one or more embodiments.

FIG. 18 illustrates an example training method, according to one or more embodiments. Referring to FIG. 18, in operation 1810, a computing apparatus may train a noise model based on modeling images having respective noises that each follow non-normal distributions and based on pixel position information. Operation 1810 may include generating a first clean modeling image from a first noise modeling image having a non-normal distribution, determining non-normal noise data of the first noise modeling image based on a difference between the first noise modeling image and the first clean modeling image, and determining mapping information of the noise model based on a mapping relationship that is based on distribution information of the non-normal noise data, pixel data of the first clean modeling image, and the pixel position information.

The distribution information may include at least one of first distribution information representing a distribution of the non-normal noise data, and second distribution information representing a distribution of normal distribution values of the non-normal noise data obtained by projecting the non-normal noise data into a normal distribution space. The second distribution information may include entire data of the normal distribution values. Alternatively, as a non-limiting example, the second distribution information may include a maximum value and a minimum value of the normal distribution values, instead of the entire data of the normal distribution values.

The noise model may include a normal distribution-based first noise model and a non-normal distribution-based second noise model. Operation 1810 may include determining normal noise data corresponding to first partial input data of the first noise modeling image that follows the non-normal distribution using the first noise model, determining residual data based on a difference between the normal noise data and non-normal noise data of the first noise modeling image, and determining mapping information of the second noise model based on a mapping relationship that is based on second partial input data of the first noise modeling image and the residual data.

In operation 1820, the computing apparatus may generate a degraded training image of a clean training image using the noise model. In operation 1830, the computing apparatus may determine a training data set based on the clean training image and the degraded training image. In operation 1840, the computing apparatus may train an image enhancement model based on the training data set, e.g., based on the training data set and many other such training data sets.

In addition, the learning method of FIG. 18 may further include operations described above with respect to FIGS. 1 through 17 and operations described below with respect to FIG. 19.

Figure 19:
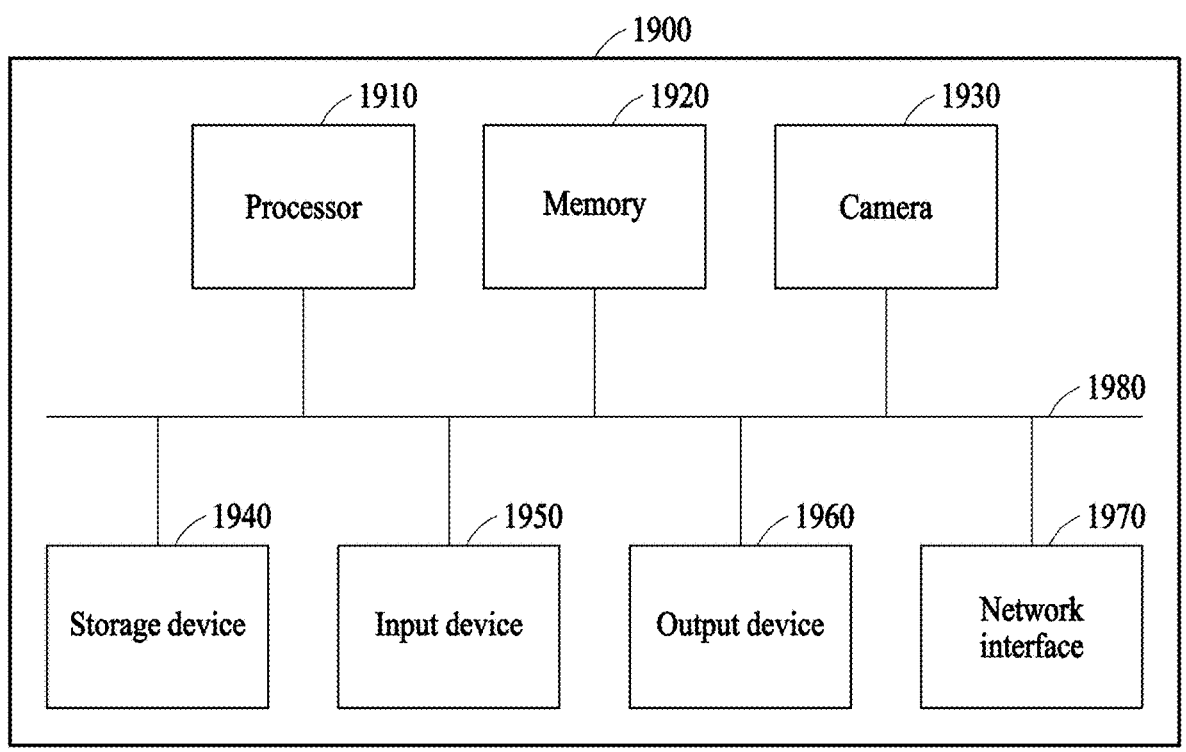
FIG. 19 illustrates an example electronic device, according to one or more embodiments.

FIG. 19 illustrates an example electronic device, according to one or more embodiments. Referring to FIG. 19, an electronic device 1900 may include a processor 1910, a memory 1920, a camera 1930, a storage device 1940, an input device 1950, an output device 1960, and a network interface 1970. These components may communicate with one another through a communication bus 1980. Each of the processor 1910, the memory 1920, the camera 1930, the storage device 1940, the input device 1950, the output device 1960, the network interface 1970, and the communication bus 1980 may be singular or plural. The electronic device 1900 may be, or embodied as at least a portion of, a mobile device, e.g., a mobile phone, a smartphone, a personal digital assistant (PDA), a netbook, a tablet computer, a laptop computer, etc., a wearable device, e.g., a smartwatch, a smart band, smart eyeglasses, etc., a computer device, e.g., a desktop, a server, etc., a home appliance, e.g., a television (TV), a smart TV, a refrigerator, etc., a security device, e.g., a door lock, etc., or a vehicle, e.g., an autonomous vehicle, a smart vehicle, etc., as non-limiting examples.

The electronic device 1900 may structurally and/or functionally include the computing apparatus 100 of FIG. 1, the computing apparatus 1500 of FIG. 15, and/or the computing apparatus 1600 of FIG. 16. In addition, each of the computing apparatus 100 of FIG. 1, the computing apparatus 1500 of FIG. 15, and the computing apparatus 1600 of FIG. 16 may each be such electronic devices, as non-limiting examples. For example, the processor 1910 may also be representative of the processor of computing apparatus 100, and the memory 1920 may also be representative of the memory of computing apparatus 100, the processor 1510 of the computing apparatus 1500 may correspond to the processor 1910 or the computing apparatus 1500 may further include the processor 1910, and the memory 1520 of the computing apparatus 1500 may correspond to the memory 1920 or the computing apparatus 1500 may further include the processor 1910, the processor 1610 of the computing apparatus 1600 may correspond to the processor 1910 or the computing apparatus 1600 may further include the processor 1910, and the memory 1620 of the computing apparatus 1600 may correspond to the memory 1920 or the computing apparatus 1600 may further include the processor 1910. Still further, the camera 1930, the storage device 1940, the input device 1950, the output device 1960, the network interface 1970, and the communication bus 1980 are also respectively representative of any one or any combination of two or more of a camera, a storage device, an input device, an output device, a network interface, and a communication bus of the computing apparatus 100, the computing apparatus 1500, and/or the computing apparatus 1600.

The processor 1910 may execute instructions and/or functions to be executed in the electronic device 1900. For example, the processor 1910 may execute instructions stored in the memory 1920 or the storage device 1940. The processor 1910 may perform any one or more, or all, of the operations described above with respect to FIGS. 1 through 18. For example, the memory 1920 may store instructions, which when executed by the processor 1910, configure the processor 1910 to perform any one or more, or all, of the operations described above with respect to FIGS. 1 through 18. The memory 1920 may store related information of such operations as well as other software and/or applications that may be executed by the electronic device 1900 for additional functionalities of the electronic device 1900. The memory 1920 is a computer-readable storage medium or a computer-readable storage device.

The camera 1930 may capture an image and/or a video. The image and/or the video may correspond to a modeling image, a training image, and an input image, as described above with respect to FIGS. 1-18. The storage device 1940 may include a computer-readable storage medium or a computer-readable storage device. The storage device 1940 may store a greater amount of information than the memory 1920 and store the information for a long period of time. The storage device 1940 may include, for example, a magnetic hard disk, an optical disc, a flash memory, a floppy disk, or any other type of nonvolatile memory, as non-limiting examples. The memory 1920 and/or the storage device 1940 may store one or more of each of any or all of the noise models described herein, one or more of each of any or all of the blur models described herein, one or more of each of any or all of the image enhancement models described herein, one or more of each of any or all of the degradation models described herein, may store any or all of respective in-training noise models and/or in-training image enhancement models described herein, as well as pairs of modeling images, training data sets, and any other training data described herein, and may store one or more of each of any or all of the mapping information described herein, such as mapping information 610 of FIG. 6 or mapping information 700 of FIG. 7, as non-limiting examples.

The input device 1950 may receive an input from a user through a traditional input method using a keyboard and a mouse, or a newer input method using, for example, a touch input, a voice input, and an image input, as non-limiting examples. The input device 1950 may include, for example, a keyboard, a mouse, a touchscreen, a microphone, or any other device that detects an input from a user and transmits the detected input to the electronic device 1900, for example. The output device 1960 may provide an output of the electronic device 1900 to a user through a visual, auditory, or tactile channel, e.g., a visual, auditory, or tactile channel of the electronic apparatus 1900. The output device 1960 may include, for example, a display, a touchscreen, a speaker, a vibration generating device, or any other device that provides an output of the electronic device 1900 to a user. The output device 1960 may also output information to an external display, touchscreen, speaker, vibration generating device, as non-limiting examples. The network interface 1970 may communicate with an external device through a wired or wireless network. In addition, the electronic device 1900 may include any one, any combination, or all hardware described herein with respect to FIGS. 1 through 18 that may be configured to perform any one, any combination, or all operations described herein with respect to FIGS. 1 through 18.

The computing apparatuses, the electronic devices, the processors, the memories, the cameras, the image sensors, the storage devices, the input devices, the output devices, the network interfaces, the communication busses, and other apparatuses, devices, units, modules, and components described herein with respect to FIGS. 1-19 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD- Rs, DVD+Rs, DVD–RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, comprising:
    generating, using a noise model, a non-normal noise map corresponding to a noise of an input image; and
    generating an enhanced image of the input image by implementing an image enhancement model based on the input image and the non-normal noise map,
    wherein the noise of the input image follows a non-normal distribution,
    wherein the generating of the non-normal noise map comprises:
    extracting a first non-normal noise distribution information for a first pixel of the input image from first mapping information of the noise model based on a first clean pixel value corresponding to the first pixel, a pixel position information of the first clean pixel value or of the first pixel, and image capturing parameters regarding a capturing of the input image;
    determining a first noise value of the first pixel from among plural noise information in the first non-normal noise distribution information for the first pixel;
    extracting a second non-normal noise distribution information for a second pixel of the input image from second mapping information of the noise model based on a second clean pixel value corresponding to the second pixel, pixel position information of the second clean pixel value or of the second pixel, and the image capturing parameters regarding the capturing of the input image;
    determining a second noise value of the second pixel from among plural noise information in the second non-normal noise distribution information for the second pixel; and
    generating the non-normal noise map based on the first noise value and the second noise value; and
    wherein the generating of the enhanced image is dependent at least on the first noise value and the second noise value.

2. The method of claim 1, wherein the generating of the non-normal noise map comprises, for each pixel of the input image:
    extracting a non-normal noise distribution information of a pixel of the input image from mapping information of the noise model based on a clean pixel data corresponding to the pixel of the input image, pixel position information of the pixel of the input image or of the clean pixel data corresponding to the pixel of the input image, and image capturing parameters regarding a capturing of the input image;
    determining a noise value of the pixel of the input image using the non-normal noise distribution information of the pixel; and
    generating the non-normal noise map based on the noise value of the pixel of the input image.

3. The method of claim 2, wherein, for each pixel of the input image, the mapping information includes a lookup table (LUT) that maps input data corresponding to the pixel, the pixel position information, and the image capturing parameters, and output data corresponding to the non-normal noise distribution information of the pixel.

4. The method of claim 2, wherein the non-normal noise distribution information of the pixel comprises first non-normal noise distribution information of the pixel,
    wherein the first non-normal noise distribution information represents a first non-normal distribution for the pixel mapped to a clean pixel value of the pixel, the pixel position information, and the image capturing parameters, and
    wherein the noise value of the pixel is randomly determined from among plural information in the first non-normal distribution.

5. The method of claim 2, wherein the non-normal noise distribution information of the pixel comprises at least one of first distribution information representing a distribution of non-normal noise data and second distribution information representing a distribution of all normal distribution values of the non-normal noise data obtained by projecting the non-normal noise data into a normal distribution space.

6. The method of claim 5, wherein the noise value of the pixel is randomly determined from among the distribution of all normal distribution values.

7. The method of claim 2,
    wherein the non-normal noise distribution information of the pixel comprises at least one of first distribution information representing a distribution of non-normal noise data and second distribution information representing a distribution of a portion of all normal distribution values of the non-normal noise data obtained by projecting the non-normal noise data into a normal distribution space, and
    wherein the second distribution information comprises a maximum value and a minimum value as the portion of all of the normal distribution values.

8. The method of claim 7, wherein the noise value of the pixel is randomly determined from among a range of values between the maximum value and the minimum value.

9. The method of claim 2, wherein the clean pixel data corresponding to the pixel of the input image is of a clean image obtained through blur filtering performed on the input image.

10. The method of claim 2, wherein the image capturing parameters comprise at least one of an International Organization for Standardization (ISO) value, an exposure time, and Bayer pattern information.

11. The method of claim 1, wherein the generating of the non-normal noise map comprises, for each pixel of the input image:
   generating a normal noise data value corresponding to first partial input data of the pixel of the input image using a normal distribution-based first noise model;
   generating a non-normal noise data value corresponding to second partial input data of the pixel of the input image using a non-normal distribution-based second noise model; and
   generating the non-normal noise map based on the normal noise data value and the non-normal noise data value.

12. The method of claim 11, wherein only the first partial input data includes pixel value information with respect to the pixel, and both of the first partial input data and the second partial input data include some overlapping image capturing parameters regarding a capturing of a first noise modeling image.

13. The method of claim 1, wherein the noise of the input image follows the non-normal distribution corresponding to image processing performed on raw image data of the input image.

14. The method of claim 1, wherein the image enhancement model is a machine learning model that is trained in advance to provide intuitive mapping relationships, for each of a training input data and a training output data of respective plural training input data and plural training output data, between the respective plural training input data and the plural training output data,
   wherein the training input data includes a corresponding training image and a corresponding training non-normal noise map is generated, using the noise model, corresponding to a noise of the corresponding training image, and
   wherein the training output data includes an enhanced image of the training image.

15. The method of claim 1, wherein the image enhancement model is trained in advance based on training images generated using the noise model.

16. The method of claim 1, further comprising:
   training the noise model based on plural modeling images having respective noises that follow non-normal distributions, including training the noise model based on a noise and pixel position information for each modeling image of the plural modeling images; and
   training the image enhancement model by, for each training data set of a plurality of training data sets,
      generating a degraded training image of a clean training image using the noise model,
      determining a training data set based on the clean training image and the degraded training image, and
      training the image enhancement model based on the training data set.

17. The method of claim 1, further comprising training the noise model, including:
   for each of a noise modeling image of a plurality of noise modeling images whose noises each follow non-normal distributions,
      generating a clean modeling image from the noise modeling image,
      determining non-normal noise data of the noise modeling image based on a difference between the noise modeling image and the clean modeling image, and
      determining mapping information of the noise model based on a mapping relationship, for each pixel of the noise modeling image, that is based on distribution information of the non-normal noise data for the pixel, pixel data of the clean modeling image corresponding to the pixel of the noise modeling image, and pixel position information corresponding to the pixel.

18. A non-transitory computer-readable storage medium storing instructions that, when executed by a processor, cause the processor to perform the method of claim 1.

19. The method of claim 1, wherein the first and second pixels are located away from a center of the input image.

20. A processor-implemented method, comprising:
   training a noise model based on plural modeling images having respective noises that follow non-normal distributions, including training the noise model based on a noise and pixel position information for each modeling image of the plural modeling images; and
   training an image enhancement model by, for each training data set of a plurality of training data sets,
   generating a degraded training image of a clean training image using the noise model,
   determining a training data set based on the clean training image and the degraded training image, and
   training the image enhancement model based on the training data set;
   wherein the training of the noise model comprises:
   generating a first clean modeling image from a first noise modeling image that follows a non-normal distribution;
   determining non-normal noise data of the first noise modeling image based on a difference between the first noise modeling image and the first clean modeling image;
   and determining mapping information of the noise model based on a mapping relationship that is based on distribution information of the non-normal noise data, pixel data of the first clean modeling image, and the pixel position information;
   wherein the distribution information comprises at least one of first distribution information representing a distribution of the non-normal noise data and second distribution information representing a distribution of at least a portion of all normal distribution values of the non-normal noise data obtained by projecting the non-normal noise data into a normal distribution space; and
   wherein the second distribution information represents only the portion of all normal distribution values, and the second distribution information comprises a maximum value and a minimum value as the portion of all of the normal distribution values.

21. The method of claim 20,
   wherein the noise model comprises a normal distribution-based first noise model and a non-normal distribution-based second noise model, and
   wherein the training of the noise model comprises:

determining normal noise data corresponding to first partial input data for the first noise modeling image that follows the non-normal distribution, using the first noise model;

determining residual data based on a difference between the normal noise data and the non-normal noise data of the first noise modeling image; and determining mapping information of the second noise model based on a mapping relationship that is based on second partial input data of the first noise modeling image and the residual data.

22. The method of claim 21, wherein only the first partial input data includes pixel value information with respect the first noise modeling image, and both of the first partial input data and the second partial data include some overlapping image capturing parameters regarding a capturing of the first noise modeling image.

23. The method of claim 20, further comprising:
generating, using the noise model, a non-normal noise pixel information corresponding to a noise of an input image; and generating an enhanced image of the input image by implementing the image enhancement model based on the input image and the non-normal noise pixel information, wherein the noise of the input image follows the non-normal distribution.

24. An electronic device, comprising:
a processor; and
a memory storing instructions, which when executed by the processor configure the processor to:
generate, using a noise model, a non-normal noise pixel information corresponding to a noise of an input image; and
generate an enhanced image of the input image by implementing an image enhancement model based on the input image and the non-normal noise pixel information,
wherein the noise of the input image follows a non-normal distribution,
wherein the instructions, which when executed by the processor, further configure the processor to:
extract a first non-normal noise distribution information for a first pixel of the input image from first mapping information of the noise model based on a first clean pixel value corresponding to the first pixel, pixel position information of the first clean pixel or of the first pixel, and image capturing parameters regarding a capturing of the input image;
determine a first noise value of the first pixel from among plural noise information in the first non-normal noise distribution information for the first pixel;
extract a second non-normal noise distribution information for a second pixel of the input image from second mapping information of the noise model based on a second clean pixel value corresponding to the second pixel, pixel position information of the second clean pixel or of the second pixel, and the image capturing parameters regarding the capturing of the input image;
determine a second noise value of the second pixel from among plural noise information in the second non-normal noise distribution information for the second pixel; and
generate the non-normal noise pixel information based on the first noise value and the second noise value; and
wherein the generation of the enhanced image is dependent at least on the first noise value and the second noise value.

25. The device of claim 24, further comprising a storage device,
wherein the generated enhanced image is stored in the storage device or the memory.

26. The device of claim 24, further comprising:
a camera; and
a display,
wherein the input image is an image captured by the camera, and the instructions further include display instructions, which when executed by the processor, configure the processor to control the display to display the enhanced image.

27. The electronic device of claim 24, wherein the first and second pixels are located away from a center of the input image.

* * * * *